(12) United States Patent
Weiss et al.

(10) Patent No.: US 11,880,040 B2
(45) Date of Patent: Jan. 23, 2024

(54) ADJUSTABLE STRAP SYSTEMS AND RELATED DEVICES AND METHODS

(71) Applicant: META PLATFORMS TECHNOLOGIES, LLC, Menlo Park, CA (US)

(72) Inventors: Simon Morris Shand Weiss, Seattle, WA (US); Braxton Landess Lathrop, Lake Oswego, OR (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 196 days.

(21) Appl. No.: 17/349,089

(22) Filed: Jun. 16, 2021

(65) Prior Publication Data

US 2022/0404627 A1   Dec. 22, 2022

(51) Int. Cl.
 *G02B 27/01* (2006.01)
(52) U.S. Cl.
 CPC ....... *G02B 27/0176* (2013.01); *Y10T 24/2187* (2015.01)
(58) Field of Classification Search
 CPC ........ G02B 27/0176; G02B 2027/0154; Y10T 24/2187; A42B 3/145; A44C 5/0069; A44C 5/22
 See application file for complete search history.

(56) References Cited

U.S. PATENT DOCUMENTS

| | | | |
|---|---|---|---|
| 9,642,412 B2 * | 5/2017 | Klotz | A42B 3/085 |
| 10,251,289 B2 * | 4/2019 | Chen | G02B 27/0176 |
| 10,365,494 B2 * | 7/2019 | Lin | G02B 27/0176 |
| 10,558,052 B2 * | 2/2020 | Chang | A43C 11/165 |
| 10,627,634 B2 * | 4/2020 | Tazbaz | G02B 27/0179 |
| 10,660,224 B2 * | 5/2020 | Wen | G02C 3/003 |
| 10,750,631 B2 * | 8/2020 | Araki | H05K 5/0017 |
| 10,863,796 B2 * | 12/2020 | Soderberg | B65H 75/30 |
| 11,119,329 B2 * | 9/2021 | Lin | G02B 27/0176 |
| 11,163,333 B2 * | 11/2021 | Lin | H04N 5/7491 |

(Continued)

FOREIGN PATENT DOCUMENTS

EP   3396436 B1   10/2020

OTHER PUBLICATIONS

International Search Report and Written Opinion for International Application No. PCT/US2022/033567, dated Oct. 5, 2022, 11 pages.

*Primary Examiner* — Robert Sandy
*Assistant Examiner* — Louis A Mercado
(74) *Attorney, Agent, or Firm* — Greenberg Traurig, LLP

(57) ABSTRACT

The disclosed strap adjustment devices may include a pinion gear, with a first rack secured to a first strap and a second rack secured to a second strap each engaged with the pinion gear. A rotatable cam element may include an angled radially outer surface that is at an angle to a circumference of the rotatable cam element. A bearing element may be positioned adjacent to the angled radially outer surface such that the bearing element jams between the angled radially outer surface and a braking surface when the rotatable cam element is rotated in a jamming direction. A spiral spring may be coupled to the pinion gear and the rotatable cam element to allow for an increase in length of the first and second straps upon application of a tension force to the first and second straps. Various other methods, systems, and devices are also disclosed.

19 Claims, 14 Drawing Sheets

(56) References Cited

U.S. PATENT DOCUMENTS

| | | | |
|---|---|---|---|
| 11,166,513 B2* | 11/2021 | King | A42B 3/145 |
| 11,185,120 B2* | 11/2021 | Manni | A42B 1/22 |
| 2013/0312163 A1 | 11/2013 | Van Waes | |
| 2021/0149205 A1* | 5/2021 | Jen | G02B 7/002 |

* cited by examiner

ADJUSTABLE STRAP SYSTEMS AND RELATED DEVICES AND METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
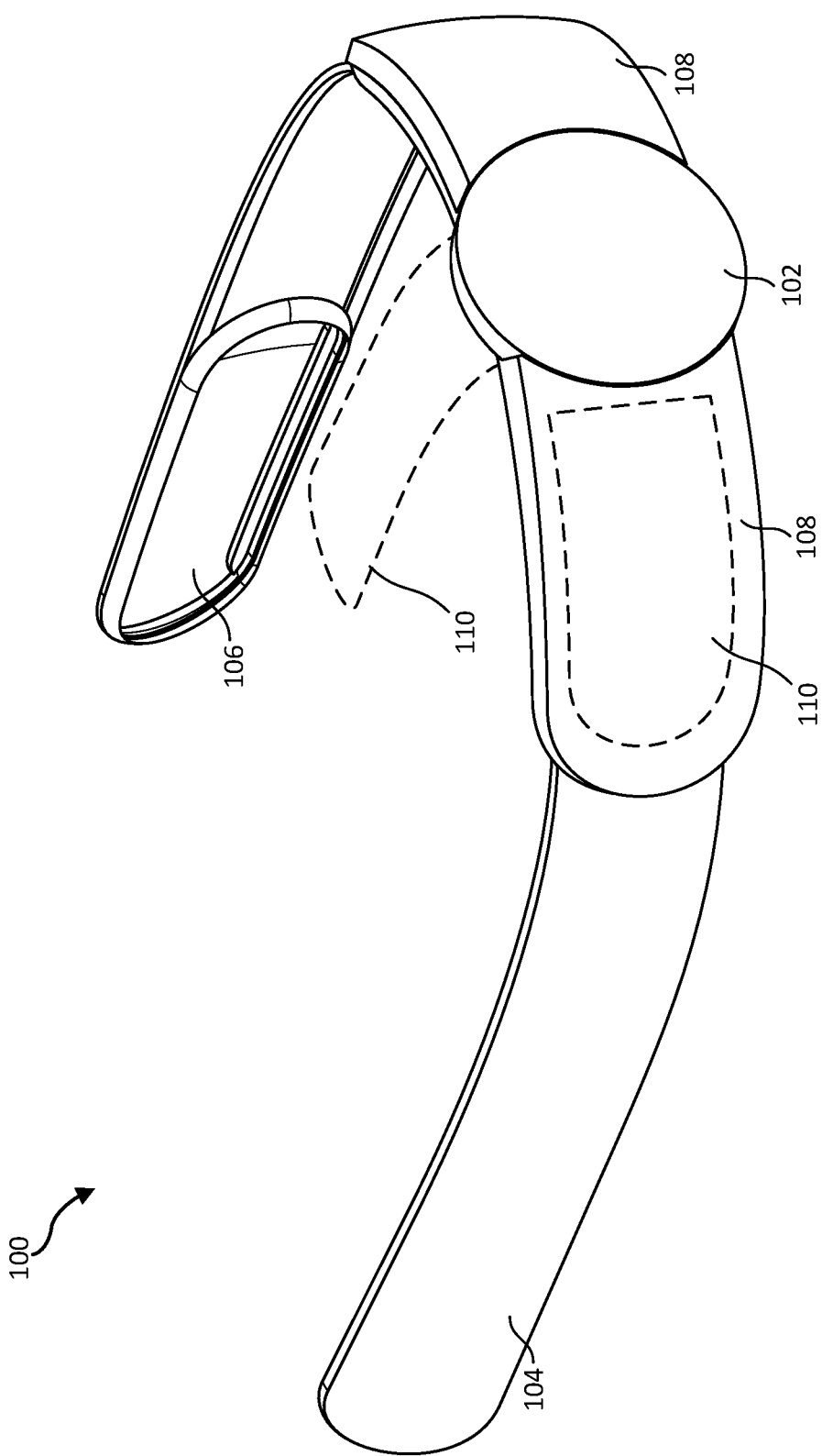
FIG. 1 is a perspective view of an adjustable strap system, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Traditional adjustable strap systems (e.g., adjustable bands) for a head-worn devices (e.g., a head-mounted display) may include an adjustment knob that, when rotated in one direction, increases the tension on the strap and allows the user to set the proper tension. Decreasing the tension in order to doff (remove) the head-worn device may require rotating the knob in an opposite direction. This may result in losing a tension setting created by the user. Some traditional adjustable strap systems may include adjustment mechanisms that utilize a ratchet design in which rotation of the adjustment knob increases or decreases the tension and/or lengths of the straps.

A traditional adjustable strap with a ratchet design may include a pawl that engages a radial tooth array to set the adjusted tension and/or lengths of the straps. The pawl may be biased to mesh into the tooth array, producing an undesirable audible clicking sound as the pawl rides over each tooth. The audible sound may be reduced with decreasing tooth size; however, this also reduces the pawl engagement with the tooth array and decreases the holding forces of the mechanism. Additional pawls may be incorporated to restore the original holding force of the mechanism, adding complexity of timing the pawls to simultaneously engage and disengage the static tooth array.

Some traditional adjustable strap systems may include a direct drive design that holds a static position once the desired tension and/or strap length set point is achieved. For an adjustable strap system on a head-mounted display (HMD), this set point may provide the necessary strap tension to pull the HMD into a user's face, compressing a facial foam on the HMD to hold the HMD in place. However, to remove the HMD, the user must either loosen the adjustment by rotating the adjustment knob, thereby losing the set point position, or maintain the set point and slide the HMD over the user's forehead. Sliding the HMD over the user's forehead without releasing the tension on the straps may cause discomfort to the user.

The present disclosure is generally directed to devices, systems, and methods for improved strap tensioning. As will be explained in greater detail below, embodiments of the present disclosure may include strap adjustment devices that include a pinion gear, a first rack secured to a first strap and engaged with the pinion gear, and a second rack secured to a second strap and engaged with the pinion gear. A rotatable cam element may include at least one radially outer surface that is at an angle to a circumference of the rotatable cam element. At least one bearing element may be positioned adjacent to the at least one angled radially outer surface. When the rotatable cam element is rotated in a jamming direction, the bearing element may jam between the angled radially outer surface and a braking surface. A spiral spring may be coupled to the pinion gear and to the rotatable cam element. The spiral spring may allow for an increase in a length of the first and second straps upon application of a tension force to the first and second straps. However, a desired tension for holding the straps against the user's head may be maintained by the rotatable cam element jamming in place as described. The user may adjust the desired tension by rotating an adjustment knob.

Embodiments of the present disclosure may operate smoothly and quietly while allowing for lengthening of the straps, such as to don or doff a head-worn device supported by the straps. The user may comfortably wear the head-worn device by altering the tension as desired with the adjustment knob. Donning and doffing may be performed without rotating the adjustment knob, and the desired tension that was set with the adjustment knob may be maintained.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-8, detailed descriptions of strap adjustment systems and tensioning mechanisms and their components. With reference to FIG. 9, the following will provide detailed descriptions of an example method for manufacturing a strap adjustment device. FIGS. 10-14 illustrate various types of example artificial-reality devices that may be used with an adjustable strap system.

FIG. 1 is a perspective view of an adjustable strap system 100, according to at least one embodiment of the present disclosure. The adjustable strap system 100 may be an adjustable strap system for a head-worn device (e.g., an HMD) that allows a user (e.g., a wearer of the HMD) to rotate an adjustment knob 102 to set a proper tension and/or length for the user when donning the head-worn device. For example, the user may rotate the adjustment knob 102 in an engaging direction (e.g., a clockwise direction when viewed from the rear of the adjustable strap system 100 as shown in FIG. 1) that decreases a length of a left strap 104 and/or a right strap 106. The distal ends of the left strap 104 and right strap 106 may be secured to a head-worn device, such as virtual-reality system 1100 of FIG. 11 and/or head-mounted display 1302 of FIG. 13. In some examples, the left strap 104 and the right strap 106 may be formed of a flexible material to wrap around the user's head.

As the adjustment knob 102 is rotated in the engaging direction and the lengths of the left strap 104 and/or right strap 106 are decreasing, the left strap 104 and right strap 106 may tighten (e.g., increase tension in) around the user's head to increase a force of the head-worn device against the user's face. The user may don the head-worn device and rotate the adjustment knob 102 until a comfortable tension setting is reached. Additionally or alternatively, the user may desire to decrease the tension (e.g., loosen) of the head-worn device by rotating the adjustment knob 102 in a disengaging direction (e.g., a counterclockwise direction when viewed from the rear of the adjustable strap system 100 as shown in FIG. 1). Rotating the adjustment knob 102 in a disengaging direction may increase the lengths of the left strap 104 and/or right strap 106 thereby decreasing the tension of the head-worn device against the user's face. As will be described in detail below with reference to FIG. 2, rotating the adjustment knob 102 may cause a length adjustment mechanism (e.g., a rack and pinion mechanism) underneath covers 108 to increase and/or decrease the lengths of the left strap 104 and/or right strap 106.

In some examples, the adjustable strap system 100 may include a power source 110. The power source 110 may include, without limitation, capacitors, solar converters, lithium ion batteries, lithium-polymer batteries, primary lithium batteries, alkaline batteries, or any other form of power storage. The power source 110 may be charged via a wired and/or wireless connection to an external power source. The power source 110 may be located anywhere within adjustable strap system 100. For example, the power source 110 may be located under the covers 108. The power source 110 may be configured to provide power to a head-worn device coupled to the adjustable strap system 100.

Optionally, in some examples, the adjustable strap system 100 may also include an overhead strap 112, which may extend upward from the covers 108 to be positioned over a head of the user. The overhead strap 112 may extend from the covers 108 to a top portion of the head-worn device. The overhead strap 112 may function to prevent the first and second straps 104, 106 from sliding down the user's head. The overhead strap 112 may be adjustable, such as by including an elastomeric material, by action of hook-and-loop fasteners, by a buckle, etc.

In some examples, the adjustable strap system 100 may allow a user to rotate the adjustment knob 102 until a comfortable tension setting is reached and provide additional travel length in the left strap 104 and/or right strap 106 to allow a user to doff (e.g., remove) the head-worn device by pulling the device away from the user's face and lifting the device off the user's head without rotating the adjustment knob 102 in the disengaging direction. As will be further explained below, the adjustable strap system 100 may include at least one bearing element that can hold the tension set by the user and a lengthening mechanism (e.g., a biasing element, such as one or more spiral springs) that increases the length of the left strap 104 and/or right strap 106 when the user is removing the head-worn device. The adjustable strap system 100 may allow the initial tension set by the user to be maintained throughout the removal process.

Figure 2:
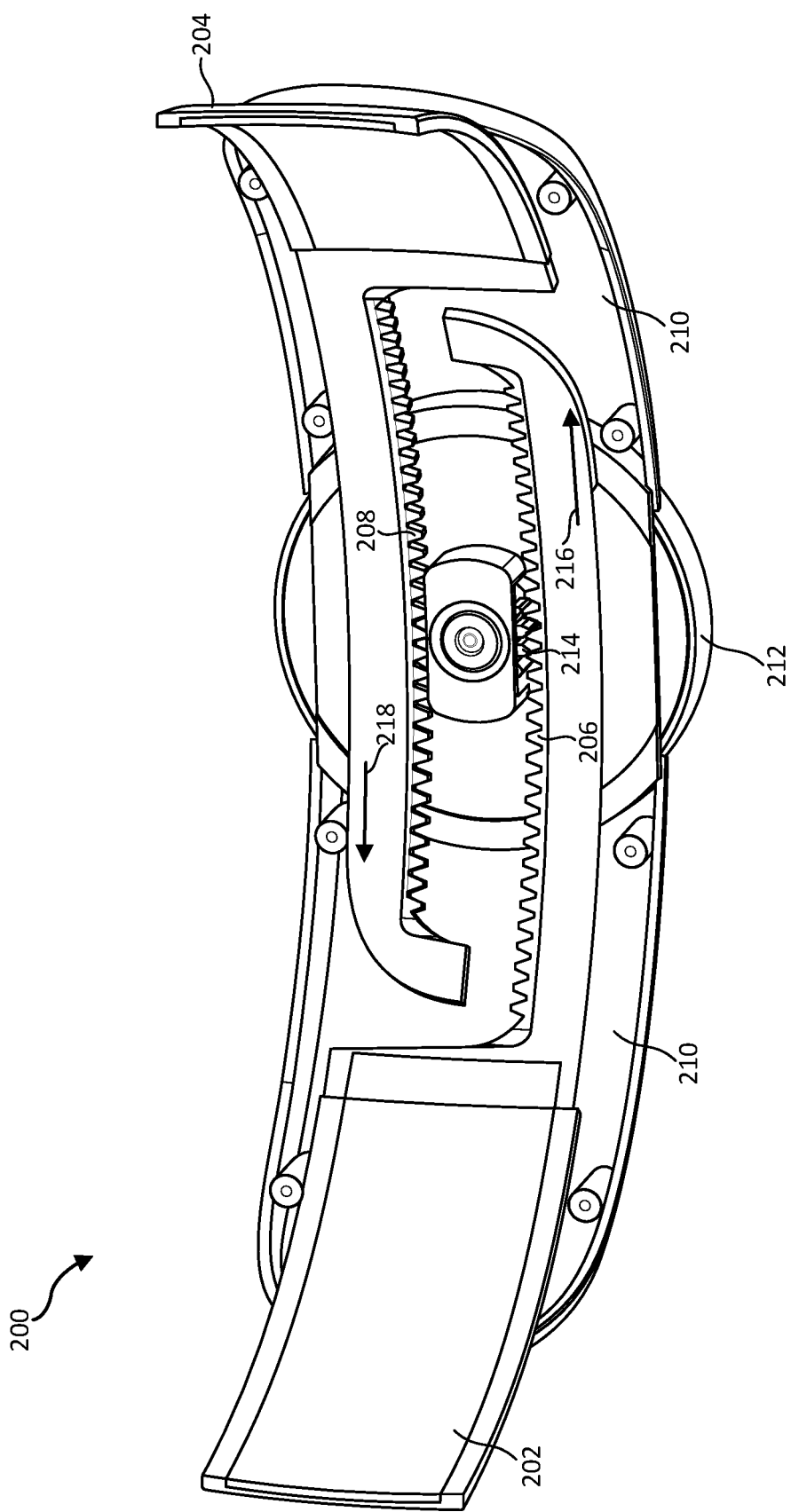
FIG. 2 is a cutaway view of an adjustable strap system, according to at least one embodiment of the present disclosure.

FIG. 2 is a cutaway view of an adjustable strap system 200, according to at least one embodiment of the present disclosure. FIG. 2 shows a strap length adjustment mechanism that includes right strap 202 and a left strap 204 that are configured to extend around a user's head, such as to support a head-worn device (e.g., a head-mounted display). The right strap 202 may be secured to a first rack 206 and the left strap may be secured to a second rack 208 of the strap length adjustment mechanism. The first rack 206 and second rack 208 may be disposed within covers 210. The covers 210 may provide an aesthetically pleasing look for the adjustable strap system 200 and may function as guides for the right strap 202, left strap 204, first rack 206, and second rack 208 as right strap 204 and/or left strap 202 are lengthened or shortened. As described above with reference to FIG. 1, an adjustment knob 212 may be rotated in an engaging direction to cause the lengths of the right strap 202 and/or left strap 204 outside of the covers 210 to decrease. As will be described in more detail below, rotation of the adjustment knob 212 may directly and/or indirectly cause a pinion gear 214 to rotate. The pinion gear 214 may be configured and positioned to engage with (e.g., mesh with) gear teeth of the first rack 206 and second rack 208 such that rotation of the pinion gear 214 causes lateral motion of the first rack 206 and second rack 208. The lateral motion of the first rack 206 and second rack 208 may, in turn, result in tightening or loosening of the right strap 202 and/or left strap 204.

For example, when the adjustment knob 212 is rotated in an engaging (e.g., tightening, shortening) direction, the pinion gear 214 may rotate in a counterclockwise direction (as viewed from the perspective of FIG. 2) such that the first rack 206 moves in a direction indicated by an arrow 216 and the second rack 208 moves in a direction indicated by an arrow 218. This engaging movement of the first rack 206 and the second rack 208 may cause a decrease in the length of right strap 202 and/or left strap 204 outside of the covers 210. Similarly, when the adjustment knob 212 is rotated in a disengaging direction, the pinion gear 214 may rotate in a clockwise direction (as viewed from the perspective of FIG. 2) such that the first rack 206 moves in a direction opposite the direction indicated by the arrow 216 and the second rack 208 moves in a direction opposite the direction indicated by the arrow 218. This disengaging movement of the first rack 206 and second rack 208 may cause an increase in the length of the right strap 202 and/or left strap 204. As noted above, the right strap 202 and left strap 204 may be secured to a head-worn device. The adjustable strap system 200 may include at least one bearing element that holds a tension set by the user and a lengthening mechanism (e.g., a spiral spring) that allows the length of the right strap 202 and/or left strap 204 to be extended when the user is removing the head-worn device without manually adjusting the adjustment knob 212.

Figure 3:
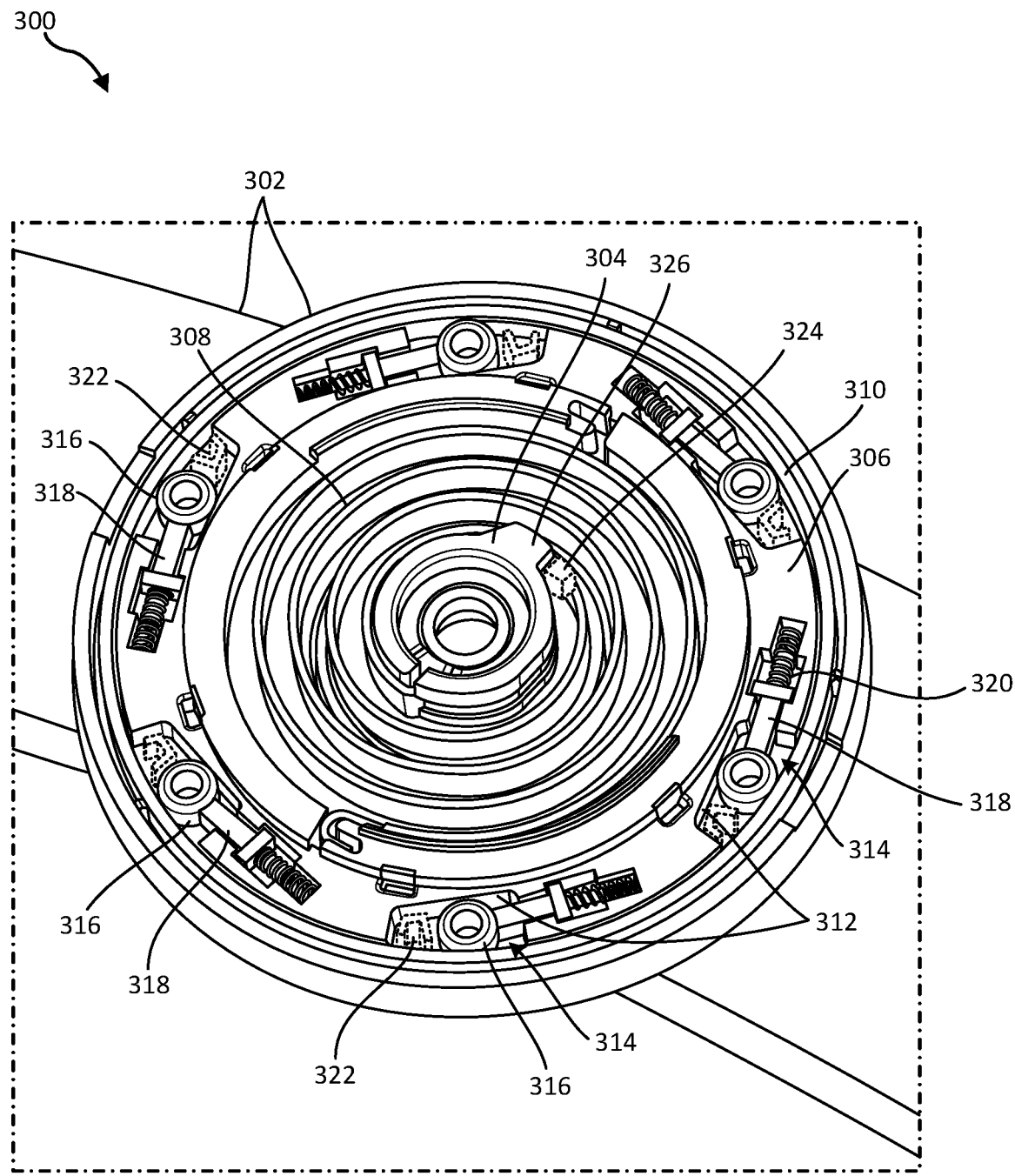
FIG. 3 is a cutaway view of a tensioning mechanism of an adjustable strap system, according to at least one embodiment of the present disclosure.

FIG. 3 is a cutaway view of a tensioning mechanism 300 of an adjustable strap system, according to at least one embodiment of the present disclosure. The tensioning mechanism 300 may allow a user to set the tension of an adjustable strap system (e.g., that is secured to a head-worn device) and may provide additional travel length to the straps. The tensioning mechanism 300 may be configured to enable a user to remove the head-worn device or otherwise stretch the adjustable strap system without changing the set tension. As described above with reference to FIGS. 1 and 2, rotating an adjustment knob may set the strap length and/or tension.

The tensioning mechanism 300 may include a housing 302, a hub 304, a rotatable cam element 306, and at least one spiral spring 308 coupling the rotatable cam element 306 to the hub 304. The hub 304 and the rotatable cam element 306 may be rotatable relative to the housing 302. On a backside (from the perspective of FIG. 3) of the tensioning mechanism 300, the hub 304 may include a pinion gear (e.g., the pinion gear 214 described above) engaged with a first rack and a second rack (e.g., the first rack 206 and second rack 208 described above), which may be respectively secured to first and second straps (e.g., the right strap 202 and left strap 204 described above). The hub 304 and the rotatable cam element 306 may be independently rotatable relative to the housing 302, but for the spiral spring 308 coupling the rotatable cam element 306 to the hub 304.

The housing 302 may include a circular drum 310, which may be an integral (e.g., co-molded) extension of the housing 302 or a separate component that is coupled to (e.g., adhered to, screwed to, press-fit into, etc.) the housing 302. The rotatable cam element 306 may be positioned within the drum 310. A radially inner surface of the drum 310 may be a braking surface. The braking surface and the drum 310 may be in the form of a ring surrounding the rotatable cam element 306.

The rotatable cam element 306 may include at least one (e.g., six as shown in the example of FIG. 3) angled radially outer surface 312 that may be at an angle to a circumference of the rotatable cam element 306. The angled radially outer surfaces 312 may be disposed inside of and offset from the outer circumference of the rotatable cam element 306 to define at least one (e.g., six as shown in the example of FIG. 3) bearing receptacle 314 between the angled radially outer surfaces 312 and the drum 310 of the housing 302. At least one bearing element 316 may be positioned within each of the bearing receptacles 314.

The bearing elements 316 may be sized and configured to jam between the angled radially outer surfaces 312 and the braking surface of the drum 310 when the rotatable cam element 306 is rotated in a jamming direction (e.g., in a counterclockwise direction from the perspective of FIG. 3). This jamming may occur because the angled radially outer surfaces 312 may cause the bearing receptacles 314 to have a narrow side and a wide side. When the rotatable cam element 306 is rotated in the jamming direction, the bearing elements 316 may be shifted into the narrow side of the bearing receptacles 314. An outer size (e.g., diameter) of the bearing elements 316 may be large enough to jam as described without reaching an end of the narrow side of the bearing receptacles 314. Conversely, when the rotatable cam element 306 is rotated in a loosening direction (e.g., in a clockwise direction from the perspective of FIG. 3), the bearing elements 316 may tend to shift toward the wide side of the bearing receptacles 314, which may unjam the bearing elements 316 from between the angled radially outer surfaces 312 and the braking surface of the drum 310.

When the bearing elements 316 are in a jammed position between the angled radially outer surfaces 312 of the rotatable cam element 306 and the braking surface of the drum 310, rotation of the rotatable cam element 306 may be inhibited (e.g., prevented, made more difficult, etc.). In the absence of purposeful rotation of an adjustment knob by the user, the spiral spring 308 may bias the rotatable cam element 306 toward the jamming direction to hold the rotatable cam element 306 rotationally in place. Additionally, at least one (e.g., six as shown in the example of FIG. 3) plunger 318 may be positioned to bias the bearing elements 316 to the jammed position. In some examples, the plungers 318 may be spring-biased by respective compression springs 320, such that moving the rotatable cam element 306 in a loosening direction may require overcoming a spring force of the compression springs 320 to unjam the bearing elements 316.

The adjustment knob (not fully shown in FIG. 3) may include at least one (e.g., six as shown in the example of FIG. 3) cam protrusion 322 extending into the bearing receptacles 314, in a location to engage with the rotatable cam element 306 when the adjustment knob is rotated in a tightening direction (e.g., clockwise in the view of FIG. 3) and to engage with the bearing elements 316 when the adjustment knob is rotated in a loosening direction (e.g., counterclockwise in the view of FIG. 3). In either case, the cam protrusions 322 may tend to unjam the bearing elements 316 from a jammed position. Thus, when the adjustment knob is rotated in either direction by the user, the rotatable cam element 306 may rotate to tighten or loosen the straps. Conversely, when the adjustment knob is not rotated by the user, the bearing elements 316 may jam between the angled radially outer surface 312 of the rotatable cam element 306 and the braking surface of the drum 310 to maintain the rotatable cam element 306 in position relative to the housing 302.

When the rotatable cam element 306 rotates in a tightening direction (e.g., clockwise in the view of FIG. 3), the spiral spring 308 may tighten and may transfer the rotation to the hub 304. Rotation of the hub 304 may, in turn, tighten the straps as explained above. The user may continue to rotate the adjustment knob in a tightening direction to rotate the rotatable cam element 306 after the straps are snug against the user's head. In this case, the hub 304 may stop rotating while the rotatable cam element 306 continues to rotate, compressing the spiral spring 308. The spring force in the spiral spring 308 may apply a tension to the straps, tightening the fit around the user's head without taking up further slack in the straps. Thus, the user may continue to rotate the adjustment knob until the tension in the straps feels snug and comfortable.

When the rotatable cam element 306 rotates in a loosening direction (e.g., counterclockwise in the view of FIG. 3), the spiral spring 308 may loosen and may transfer the rotation to the hub 304. In some examples, a pinion engagement protrusion 324 extending inward from the adjustment knob may be positioned to engage the hub 304 (e.g., a radial protrusion 326 of the hub 304) when the adjustment knob is rotated in a loosening direction, further causing the hub 304 to rotate in a direction to loosen the straps.

If the user wishes to don or doff the straps and any head-mounted device supported by the straps, the user may apply tension to the straps to lengthen the straps without rotating the adjustment knob. In this situation, the hub 304 may be forced to rotate due to the engagement of racks with the pinion of the hub 304 (e.g., the racks 206, 208 with the pinion 214 of FIG. 2). From the perspective of FIG. 3, the hub 304 may rotate in a counterclockwise direction when the straps are pulled apart and lengthened to fit around the user's head for donning or doffing. Such rotation of the hub 304 may tighten the spiral spring 308. The tightening of the spiral spring 308 may urge the rotatable cam element 306 in a counterclockwise direction. However, due to the jamming of the bearing elements 316 between the angled radially outer surface 312 of the rotatable cam element 306 and the drum 310, rotation of the rotatable cam element 306 in the counterclockwise direction may be inhibited. The adjustment knob may also maintain its set position. The user may lengthen the straps as far as the spiral spring 308 may allow and/or until the radial protrusion 326 of the hub 304 abuts against the pinion engagement protrusion 324 of the adjustment knob. This increase in the length of each of the straps may be up to about 5 mm, about 10 mm, about 15 mm, about 20 mm, about 25 mm, or farther. This allowable distance may be preselected by choosing or fabricating the spiral spring 308 to have a predetermined maximum compression distance, by adjusting a diameter of the pinion, etc. Thus, the tensioning mechanism 300 may allow the user to comfortably don and doff the head-worn device while maintaining the nominal set strap lengths.

As illustrated in FIG. 3, in some embodiments the bearing elements 316 may be circular (e.g., generally cylindrical) roller bearing elements. However, the present disclosure is not so limited. In additional embodiments, the bearing elements may be or include a wedge, a sphere, a triangular prism, etc.

The braking surface of the drum 310, the angled radially outer surface 312 of the rotatable cam element 306, and/or the bearing elements 316 may include materials that are configured to facilitate jamming of the bearing elements 316 as explained above. In some embodiments, the materials may also be selected to be durable and to result in smooth operation of the tensioning mechanism 300. For example, the bearing elements 316 may include metallic inner core and a polymer outer ring. The polymer outer ring may include at least one of a blend of polycarbonate and acrylonitrile butadiene styrene ("PC-ABS"), a nylon material, and/or a fluoropolymer material. The rotatable cam element 306 may be formed of a polymer material, such as a nylon material or a fluoropolymer material. The drum 310 may include a metallic material and/or a polymer material, such as aluminum, PC-ABS, and/or a nylon material. The plungers 318 may include a low-friction material to enable the bearing elements 316 to rotate when the plungers 318 press against the bearing elements 316. For example, the plungers may include a polymer material, such as a fluoropolymer material.

The example embodiment shown in FIG. 3 includes one spiral spring 308. However, any number of spiral springs 308 may be included in the tensioning mechanism 300, such as two, three, or more interleaved (e.g., nested) spiral springs 308. Further, although FIG. 3 shows a spiral spring 308, any type of spring (e.g., a clock spring, a torsion spring, etc.) or any other suitable biasing element (e.g., an elastic member) may be included in the tensioning mechanism 300. The spiral spring 308 may include any type of spring material including, without limitation, spring steel, stainless steel, titanium, alloy steel, high carbon steel, a polymer material, a composite material, or a combination thereof. In additional embodiments, the spiral spring 308 may be replaced by another biasing element, such as by one or more leaf springs, compression springs, compliant mechanisms, pneumatic cylinders, etc.

In some embodiments, the spiral spring 308 may be preloaded (e.g., compressed) when the tensioning mechanism 300 is assembled. Thus, the radial protrusion 326 of the hub 304 may initially abut against the pinion engagement protrusion 324 of the adjustment knob. The preloading may urge the rotatable cam element 306 into a jammed state, so that the straps may be held in their initial tension setting, even in the absence of rotating the adjustment knob. In addition, the preloading may take up slack that might otherwise be present between the adjustment knob and the hub 304. Thus, the preloaded spiral spring 308 may exert a holding force against the pinion.

In FIG. 3, six sets of jamming components are illustrated along a perimeter of the tensioning mechanism 300. Each of these sets of jamming components may include an angled radially outer surface 312, a bearing receptacle 314, a bearing element 316, a plunger 318, a compression spring 320, and a cam protrusion 322. However, the present disclosure is not limited to configurations with exactly six sets of jamming components. In additional examples, a different number of such sets may be included in the tensioning mechanism 300, such as two sets, three sets, four sets, five sets, or more than six sets.

Figure 4:
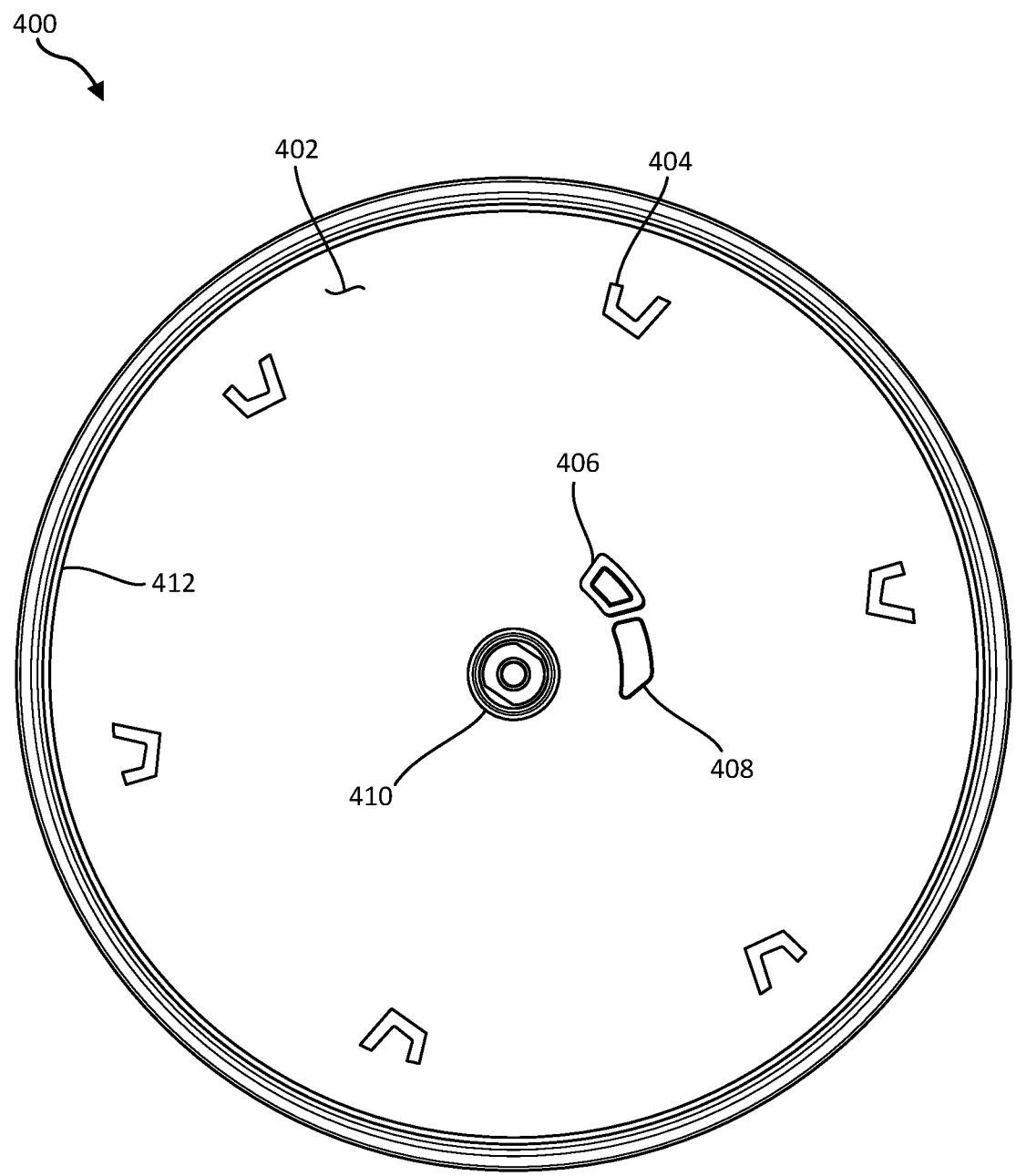
FIG. 4 is an internal plan view of an adjustment knob of an adjustable strap system, according to at least one embodiment of the present disclosure.

FIG. 4 is an internal plan view of an adjustment knob 400 of an adjustable strap system, according to at least one embodiment of the present disclosure. An internal surface 402 of the adjustment knob 400 may be configured to face the internal components of a corresponding tensioning mechanism, such as the tensioning mechanism 300 discussed above with reference to FIG. 3.

As shown in FIG. 4, cam protrusions 404 may extend from the internal surface 402 of the adjustment knob 400. The cam protrusions 404 may be sized, shaped, and positioned to extend into bearing receptacles (e.g., the bearing receptacles 314 of FIG. 3), for abutting against a rotatable cam element (e.g., the rotatable cam element 306 of FIG. 3) to rotate the rotatable cam element and/or against a bearing element (e.g., the bearing element 316 of FIG. 3), depending on which direction the adjustment knob 400 is rotated. The cam protrusions 404 may be positioned near an outer circumference of the adjustment knob 400 in locations that correspond to the bearing receptacles of an underlying tensioning mechanism. The cam protrusions 404 may be an integral, unitary part of the adjustment knob 400, such as by being co-molded with other parts of the adjustment knob 400. In additional embodiments, the cam protrusions may be attached to the adjustment knob 400, such as via a screw, bolt, adhesive, and/or press-fit connection.

The adjustment knob 400 may also include a pinion engagement protrusion 406 extending from the internal surface 402 of the adjustment knob 400. The pinion engagement protrusion 406 may be positioned near a center of the adjustment knob 400 in a location to engage with a corresponding hub and/or pinion of an underlying tensioning mechanism (e.g., the hub 304 of tensioning mechanism 300 of FIG. 3, the pinion 214 of adjustable strap system 200 of FIG. 2).

In some embodiments, the adjustment knob 400 may include a cutout 408 adjacent to the pinion engagement protrusion 406. The cutout 408 may be useful for optically aligning the adjustment knob 400 with an underlying tensioning mechanism during assembly of the adjustment knob 400 to the tensioning mechanism. The cutout 408 may help ensure that the cam protrusions 404 and pinion engagement protrusion 406 are in their proper positions relative to the tensioning mechanism.

The adjustment knob 400 may also include a central post 410. The adjustment knob 400 may be configured to rotate about the central post 410, which may be positioned within a corresponding receptacle of an underlying housing (e.g., the housing 302 of FIG. 3) and/or hub (e.g., the hub 304 of FIG. 3) when assembled. The central post 410 may also hold the adjustment knob 400 in position, such as by providing a location for screwing the adjustment knob 400 in place and/or for snap-fitting the adjustment knob 400 in place. In additional embodiments, the central post 410 may be omitted, and the adjustment knob 400 may be configured to rotate about a peripheral lip 412 of the adjustment knob 400, which may be positioned over and around a housing support (e.g., the drum 310 of FIG. 3).

Figure 5:
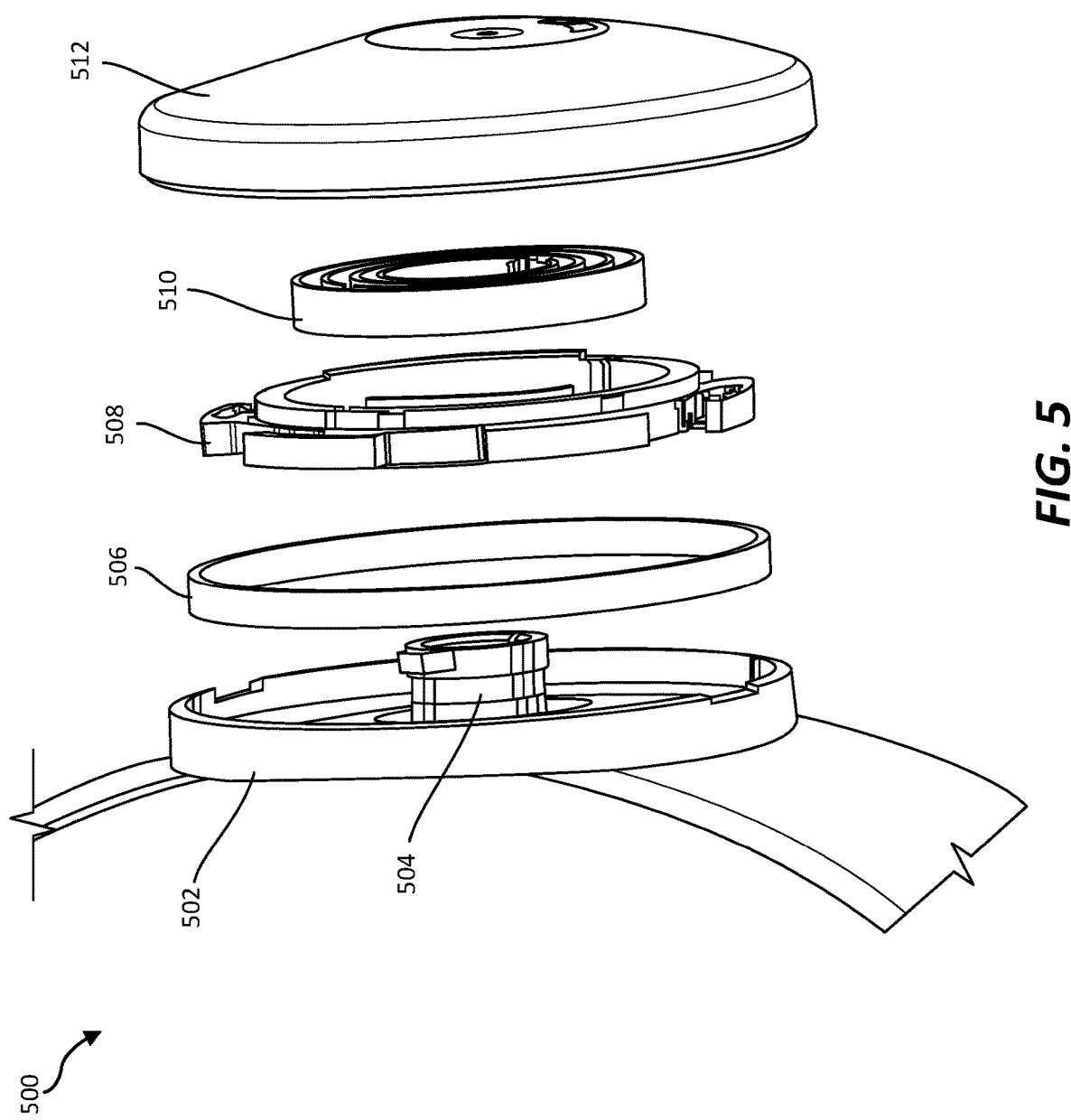
FIG. 5 is an exploded view of an adjustable strap system, according to at least one embodiment of the present disclosure.

FIG. 5 is an exploded view of an adjustable strap system 500, according to at least one embodiment of the present disclosure. The adjustable strap system 500 may include a housing 502, a hub 504, a drum 506, a rotatable cam element 508, a spiral spring 510, and an adjustment knob 512. Other components of the adjustable strap system 500 (e.g., bearing elements, plungers, compressible springs, etc.) are not shown in the view of FIG. 5 to facilitate a view of those components that are shown. The housing 502 may serve as a base for the remaining components of the adjustable strap system 500. The housing 502 may also cover end portions of the straps, racks (e.g., the racks 206, 208 of FIG. 2), and other internal components of the adjustable strap system 500. The hub 504 may include a pinion for engaging the racks coupled to the straps. The hub 504 may be rotatable relative to the housing 502.

The drum 506 may be a ring of material against which a bearing element may be jammed when the adjustable strap system 500 is in a steady state. As illustrated in FIG. 5, in some embodiments the drum 506 may be a separate component from the housing 502, such as when it may be desired to form the drum 506 of a material that is different from the housing 502. In this case, the drum 506 may be rigidly secured to the housing 502, such as by press fitting the drum 506 into the housing 502, by coupling the drum 506 to the housing 502 with screws, pins, dowels, or other fasteners, and/or by adhering the drum 506 to the housing 502. In additional embodiments, the drum 506 may be an integral, unitary part of the housing 502, such as by providing the drum 506 as part of the housing 502. In further embodiments, the drum 506 may be a coating applied to the housing 502.

The rotatable cam element 508 may be sized to fit within the drum 506. The rotatable cam element 508 may be configured as the rotatable cam element 306 described above with reference to FIG. 3.

The spiral spring 510 may be configured to rotatably couple the rotatable cam element 508 to the hub 504, and may have sufficient slack to allow the hub 504 to rotate relative to the rotatable cam element 508 when the user applies a tension to the straps, such as for donning and/or doffing a head-worn device. The spiral spring 510 may be configured as the spiral spring 308 described above with reference to FIG. 3. The spiral spring 510 may be a single spiral spring or two or more nested spiral springs.

The adjustment knob 512 may be configured to enable the user to set an initial tension in the straps by rotating the adjustment knob 512. Rotation of the adjustment knob 512 may cause rotation of the rotatable cam element 508, which may in turn cause loosening or tightening of the straps. The adjustment knob 512 may be configured as the adjustment knob 400 described above with reference to FIG. 4.

Figure 6:
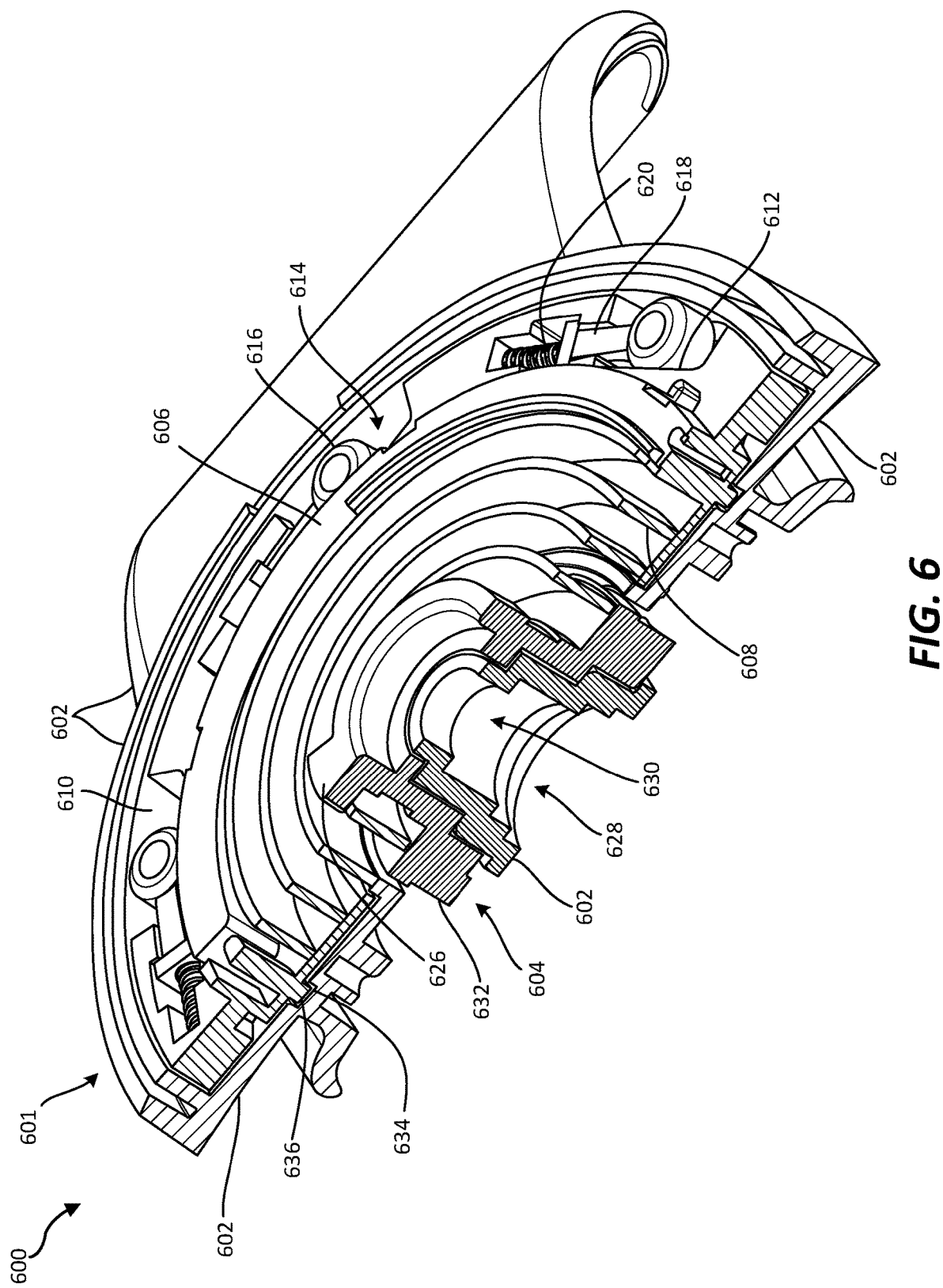
FIG. 6 is a cutaway cross-sectional view of an adjustable strap system, according to at least one embodiment of the present disclosure.

FIG. 6 is a cutaway cross-sectional view of an adjustable strap system 600, according to at least one embodiment of the present disclosure. The adjustable strap system 600 may include a tensioning mechanism 601. In some respects, the tensioning mechanism 601 may be similar to the tensioning mechanism 300 discussed above with reference to FIG. 3. For example, the tensioning mechanism 601 may include a housing 602, a hub 604, a rotatable cam element 606, a spiral spring 608, and a drum 610. The rotatable cam element 606 may include a plurality of angled radially outer surfaces 612, which may define bearing receptacles 614 for containing bearing elements 616. The bearing elements 616 may be configured to jam between the angled radially outer surfaces 612 and the drum 610. The bearing elements 616 may be urged into a jammed position by plungers 618, which may be biased by compressing springs 620.

As shown in FIG. 6, the housing 602 may include a central axle 628 about which some components of the tensioning mechanism 601 may rotate during operation. For example, the hub 604 may be positioned against and around the central axle 628. The central axle 628 may include a central hole 630, which may be configured to receive a central post of an adjustment knob (e.g., the central post 410 of the adjustment knob 400 of FIG. 4).

A lower end of the hub 604 may include a pinion gear 632 for engaging (e.g., meshing with) a rack coupled to the straps to be adjusted (e.g., tightened or loosened) by the adjustable strap system 600. An upper end of the hub 604 may include a radial protrusion 626, which may be configured for engaging with a pinion engagement protrusion of an adjustment knob (e.g., the pinion engagement protrusion 406 of the adjustment knob 400 of FIG. 4).

The housing 602 may include a feature for seating the rotatable cam element 606 and for allowing the rotatable cam element 606 to rotate. For example, the housing 602 may include a groove 634 complementary to an extension 636 on a bottom of the rotatable cam element 606, as shown in FIG. 6. In additional embodiments, the housing 602 may include an extension and the rotatable cam element 606 may include a complementary groove.

Figure 7:
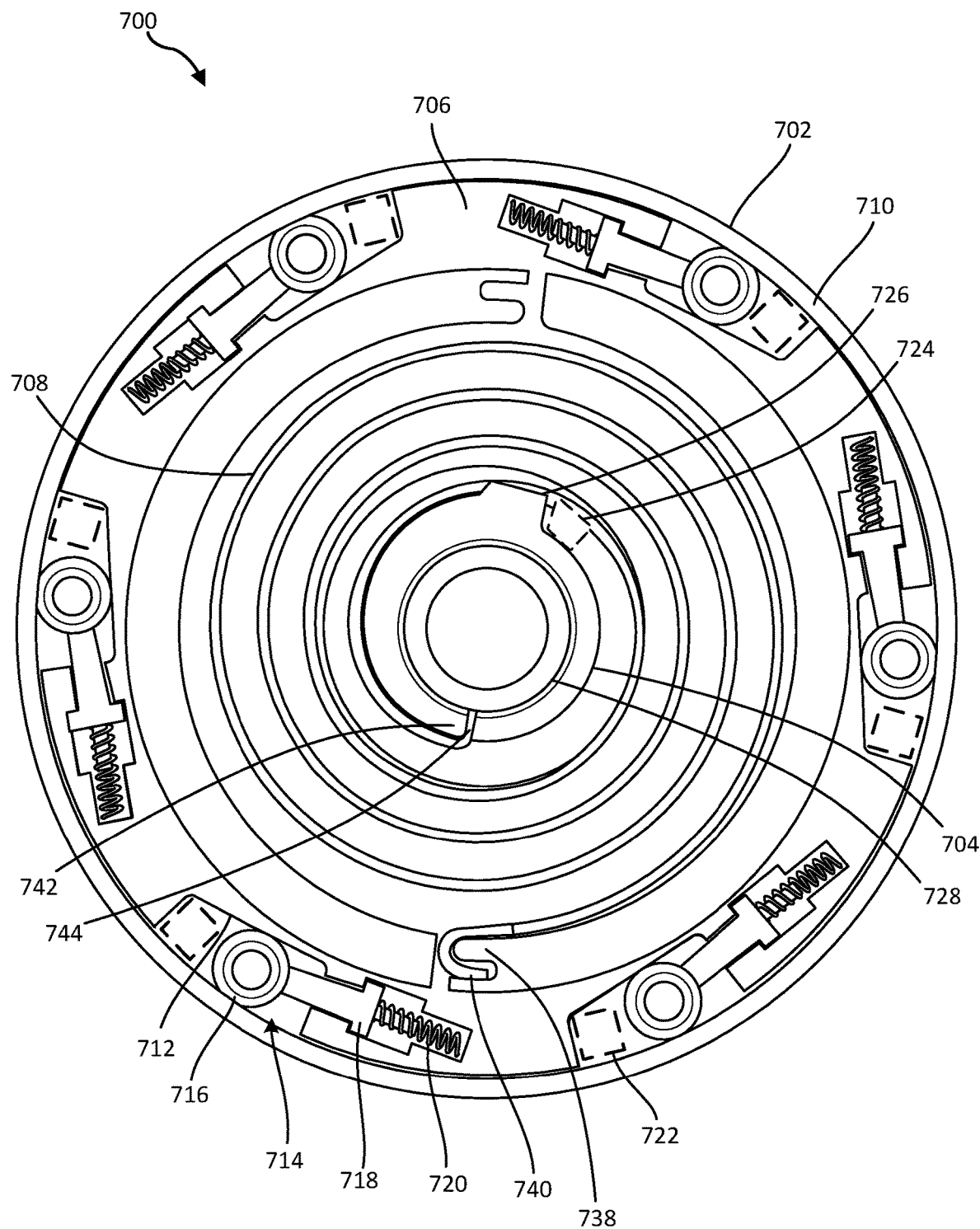
FIG. 7 is a plan view of a tensioning mechanism, according to at least one embodiment of the present disclosure.

FIG. 7 is a plan view of a tensioning mechanism 700, according to at least one embodiment of the present disclosure. In some respects, the tensioning mechanism 700 may be similar to the tensioning mechanisms described above, such as the tensioning mechanism 300 of FIG. 3 and the tensioning mechanism 601 of FIG. 6. For example, the tensioning mechanism 700 may include a housing 702, a hub 704, a rotatable cam element 706, a spiral spring 708, and a drum 710. The rotatable cam element 706 may include a plurality of angled radially outer surfaces 712, which may define bearing receptacles 714 for containing bearing elements 716. The bearing elements 716 may be configured to jam between the angled radially outer surfaces 712 and a braking surface (e.g., a radially inner surface) of the drum 710. The bearing elements 716 may be urged into a jammed position by plungers 718, which may be biased by compression springs 720.

As explained above, the bearing elements 716 may be configured to jam between the angled radially outer surfaces 712 of the rotatable cam element 706 and the drum 710 when a desired strap tension has been set by the user rotating an adjustment knob. The adjustment knob may include cam protrusions 722 positioned to extend into the bearing receptacles 714 and a pinion engagement protrusion 724 positioned to engage with a radial protrusion 726 of the hub 704. The hub 704 may be positioned around, and may be configured to rotate around, a central axle 728 of the housing 702.

As shown in FIG. 7, the rotatable cam element 706 may include a spring engagement feature 738, such as a notch, for coupling the spiral spring 708 to the rotatable cam element 706. The spiral spring 708 may include a complementary hook 740 for engaging with the spring engagement feature 738. Likewise, the hub 704 may include a spring retention feature 742, such as a slot, for coupling the spiral spring 708 to the hub 704. The spiral spring 708 may include a complementary catch 744 for engaging the spring retention feature 742 of the hub 704.

Figure 8:
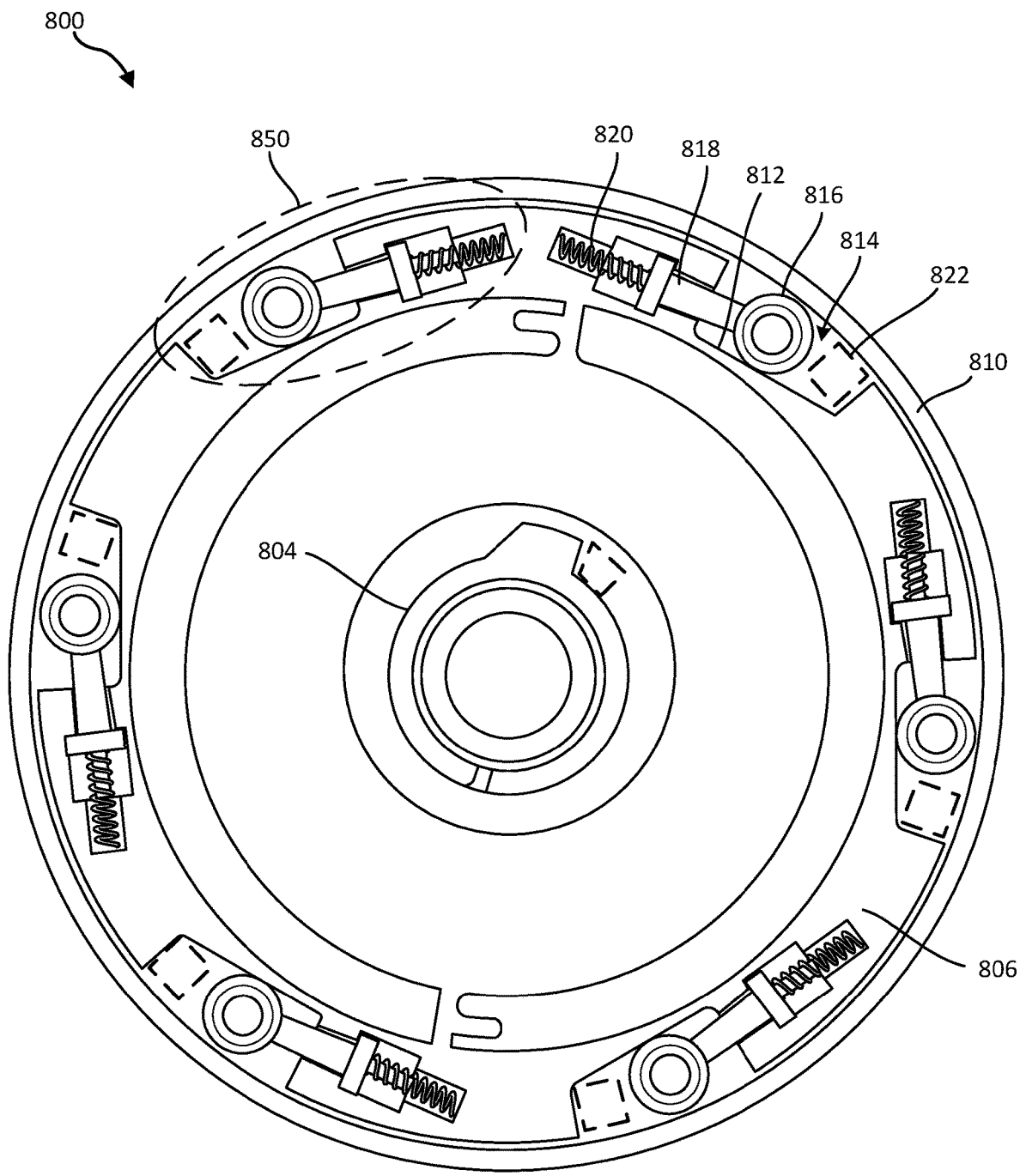
FIG. 8 is a plan view of a tensioning mechanism, according to at least one additional embodiment of the present disclosure.
Figure 9:
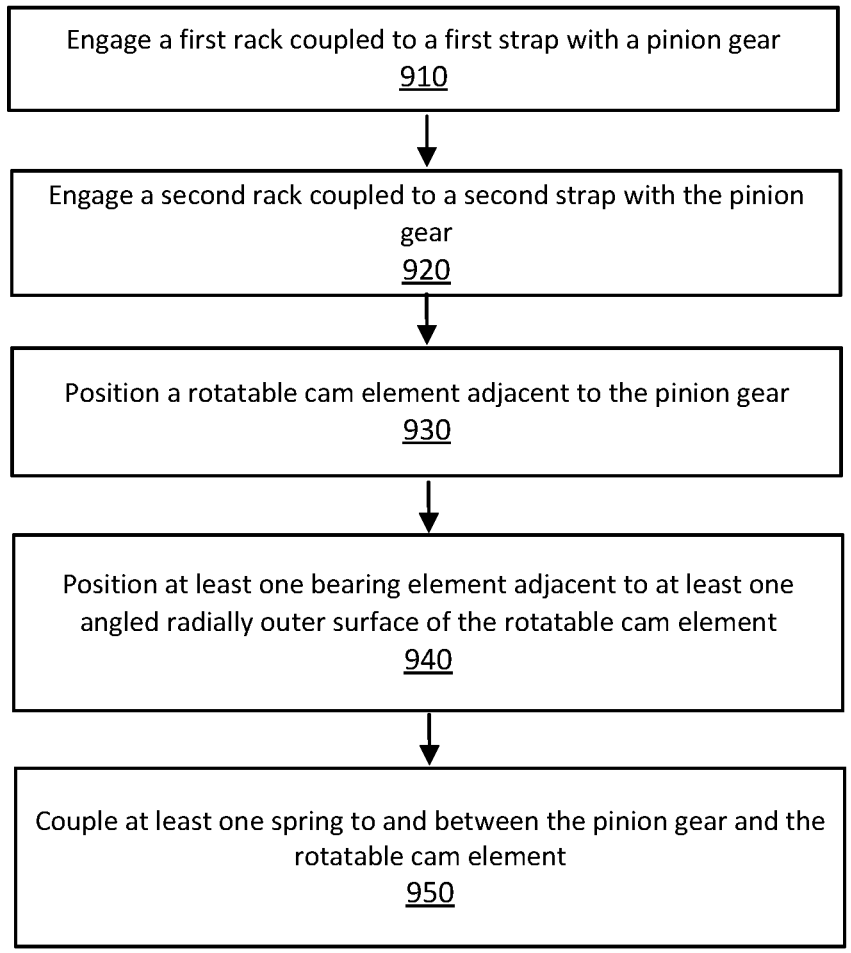
FIG. 9 is a flow diagram illustrating an example method of manufacturing a strap adjustment device, according to at least one embodiment of the present disclosure.

FIG. 8 is a plan view of a tensioning mechanism 800, according to at least one additional embodiment of the present disclosure. The tensioning mechanism 800 may be similar to the tensioning mechanism 700 described above with reference to FIG. 7. For example, the tensioning mechanism 800 may include six sets of jamming components that each include an angled radial outer surface 812 of a rotatable cam element 806, a bearing receptacle 814, a bearing element 816, a plunger 818, a compression spring 820 for biasing the plunger 818, and a cam protrusions 822 of an adjustment knob. However, at least one of these sets of jamming components (outlined in a dashed ellipse 850 in FIG. 8) may be oriented in an opposite direction to the other sets. The bearing element 816 of this opposed set of jamming components may tend to become jammed between the angled radial outer surface 812 and a braking surface (e.g., of a drum 810) when the rotatable cam element 806 is rotated in a direction that unjams the other bearing elements 816 of the other sets (e.g., a strap tightening direction, clockwise in the view of FIG. 8). The opposed set of jamming components may inhibit an inadvertent tightening of the corresponding straps that may not be instigated by rotation of the adjustment knob.

For example, in some configurations, when the straps are forced inward toward each other (e.g., compressed), a hub 804 may be forced to rotate due to engagement with racks at ends of the straps. The rotation of the hub 804 may cause a spiral spring (not shown in FIG. 8) to compress, which may in turn apply a force to the rotatable cam element 806 in a typically unjamming direction. If all the sets of jamming components face the same direction, then there may be little to inhibit this unintended rotation of the rotatable cam element 806 and a resulting resetting of a desired strap tension.

However, the at least one of the sets of jamming components oriented in an opposite direction may jam in this case, inhibiting undesired rotation of the rotatable cam element 806. In this case, the resetting of the initial strap tension may be set only by rotation of the adjustment knob, and not by manually compressing or stretching the straps.

Purposeful resetting of a strap tension may still be possible with the tensioning mechanism 800 of FIG. 8. For example, when a user rotates the adjustment knob in a tightening direction (e.g., clockwise in the view of FIG. 8), the cam protrusion 822 in the set of jamming components that is oriented opposite from the other sets may abut against the bearing element 816 to unjam the bearing element 816 from between the corresponding angled radially outer surface 812 and the drum 810. Similarly, when the adjustment knob is rotated in a loosening direction (e.g., counterclockwise in the view of FIG. 8), the cam protrusion 822 in the opposing set of jamming components may tend to force the rotatable cam element 806 in a direction that unjams the bearing element 816 thereof.

Although FIG. 8 illustrates only one set of jamming components that is oriented opposite to the other sets, the present disclosure is not so limited. For example, in additional embodiments, two or three of the sets of jamming components may be oriented opposite to the other sets to inhibit unintentional resetting of a strap tension.

FIG. 9 is a flow diagram illustrating an example method 900 of manufacturing a strap adjustment device, according to at least one embodiment of the present disclosure. At operation 910, a first rack coupled to a first strap may be engaged with a pinion gear. Operation 910 may be performed in a variety of ways. For example, the first rack may be meshed with gear teeth of the pinion gear along a bottom edge of the pinion gear.

At operation 920, a second rack coupled to a second strap may be engaged with the pinion gear. Operation 920 may be performed in a variety of ways. For example, the second rack may be meshed with the gear teeth of the pinion gear along a top edge of the pinion gear, opposite the first rack.

At operation 930, a rotatable cam element may be positioned adjacent to the pinion gear. Operation 930 may be performed in a variety of ways. For example, the rotatable cam element may be positioned radially around the pinion gear and may have a rotational axis that is the same as that of the pinion gear. The rotatable cam element may include at least one angled radially outer surface that is at an angle to a circumference of the rotatable cam element. The angled radially outer surface may be offset inward from the circumference, defining a bearing receptacle radially outside of the angled radially outer surface. By way of example and not limitation, the rotatable cam element may be configured as any of the rotatable cam elements 306, 508, 606, 706, or 806 discussed above.

At operation 940, at least one bearing element may be positioned adjacent to the at least one angled radially outer surface of the rotatable cam element. Operation 940 may be performed in a variety of ways. For example, a roller bearing element, ball bearing element, or wedge bearing element may be positioned in the bearing receptacle. The bearing element may be sized and positioned to jam against the at least one angled radially outer surface when the rotatable cam element is rotated in a jamming direction.

At operation 950, at least one spring may be coupled to and between the pinion gear and the rotatable cam element. Operation 950 may be performed in a variety of ways. For example, an inner end of at least one spiral spring may be secured to the pinion gear and an outer end of the at least one spiral spring may be secured to the rotatable cam element. The spiral spring may be positioned and configured to allow for an increase in a length of the first strap and/or second strap by deformation of the spiral spring, such as when a user dons and doffs a head-worn device supported by the straps.

Accordingly, the present disclosure may include systems, devices, and methods related to adjustable straps, such as head straps for supporting a head-worn device. The disclosed embodiments may allow the user to rotate an adjustment knob to set a desired strap tension but may also provide additional strap extension in the case of the user donning or doffing the head-worn device. This additional strap extension may occur without rotating the adjustment knob by taking up slack in a spiral spring while a rotatable cam element of a tensioning mechanism is jammed in place.

When the user desires to adjust a length and/or tension in the straps, the user may further rotate the adjustment knob to achieve the desired result.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
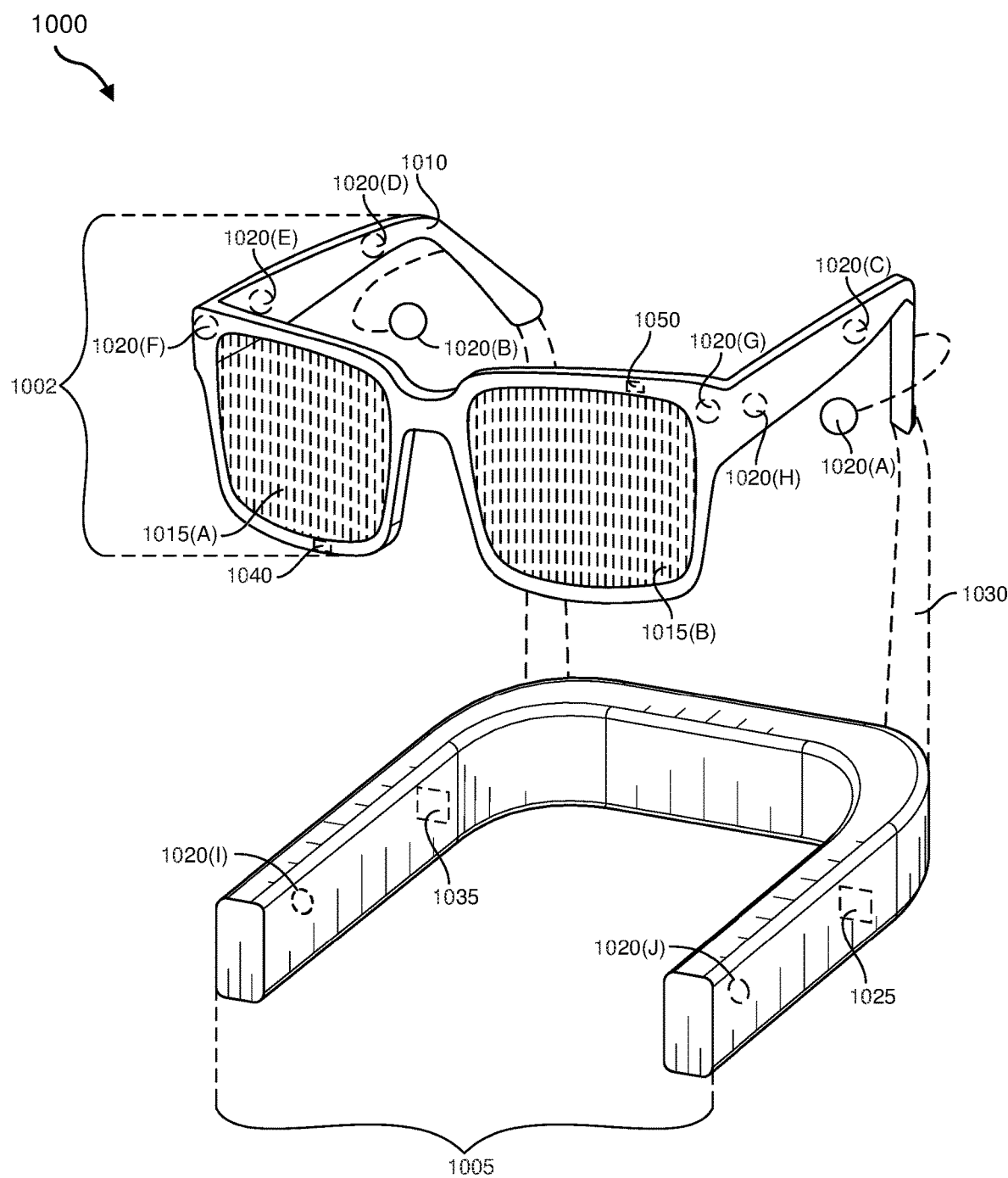
FIG. 10 is an illustration of example augmented-reality glasses that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the augmented-reality system 1000 includes two displays, embodiments of this disclosure may be implemented in augmented-reality systems with a single NED or more than two NEDs.

In some embodiments, the augmented-reality system 1000 may include one or more sensors, such as sensor 1040. The sensor 1040 may generate measurement signals in response to motion of the augmented-reality system 1000 and may be located on substantially any portion of the frame 1010. The sensor 1040 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1000 may or may not include the sensor 1040 or may include more than one sensor. In embodiments in which the sensor 1040 includes an IMU, the IMU may generate calibration data based on measurement signals from the sensor 1040. Examples of the sensor 1040 may include, without limitation, accelerometers, gyroscopes, magnetometers, other suitable types of sensors that detect motion, sensors used for error correction of the IMU, or some combination thereof.

In some examples, the augmented-reality system 1000 may also include a microphone array with a plurality of acoustic transducers 1020(A)-1020(J), referred to collectively as acoustic transducers 1020. The acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on the frame 1010, and/or acoustic transducers 1020(I) and 1020(J), which may be positioned on a corresponding neckband 1005.

In some embodiments, one or more of the acoustic transducers 1020(A)-(J) may be used as output transducers (e.g., speakers). For example, the acoustic transducers 1020(A) and/or 1020(B) may be earbuds or any other suitable type of headphone or speaker.

The configuration of the acoustic transducers 1020 of the microphone array may vary. While the augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on the frame 1010, an orientation associated with each acoustic transducer 1020, or some combination thereof.

The acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to the acoustic transducers 1020 inside the ear canal. Having an acoustic transducer 1020 positioned next to an ear canal of a user may enable the microphone array to collect information on how sounds arrive at the ear canal. By positioning at least two of the acoustic transducers 1020 on either side of a user's head (e.g., as binaural microphones), the augmented-reality device 1000 may simulate binaural hearing and capture a 3D stereo sound field around about a user's head. In some embodiments, the acoustic transducers 1020(A) and 1020(B) may be connected to the augmented-reality system 1000 via a wired connection 1030, and in other embodiments the acoustic transducers 1020(A) and 1020(B) may be connected to the augmented-reality system 1000 via a wireless connection (e.g., a BLUETOOTH connection). In still other embodiments, the acoustic transducers 1020(A) and 1020(B) may not be used at all in conjunction with the augmented-reality system 1000.

The acoustic transducers 1020 on the frame 1010 may be positioned in a variety of different ways, including along the length of the temples, across the bridge, above or below the display devices 1015(A) and 1015(B), or some combination thereof. The acoustic transducers 1020 may also be oriented such that the microphone array is able to detect sounds in a wide range of directions surrounding the user wearing the augmented-reality system 1000. In some embodiments, an optimization process may be performed during manufacturing of the augmented-reality system 1000 to determine relative positioning of each acoustic transducer 1020 in the microphone array.

In some examples, the augmented-reality system 1000 may include or be connected to an external device (e.g., a paired device), such as the neckband 1005. The neckband 1005 generally represents any type or form of paired device. Thus, the following discussion of the neckband 1005 may also apply to various other paired devices, such as charging cases, smart watches, smart phones, wrist bands, other wearable devices, hand-held controllers, tablet computers, laptop computers, other external compute devices, etc.

As shown, the neckband 1005 may be coupled to the eyewear device 1002 via one or more connectors. The connectors may be wired or wireless and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and neckband 1005, the components may be located elsewhere and/or distributed differently on the eyewear device 1002 and/or neckband 1005. In some embodiments, the components of the eyewear device 1002 and neckband 1005 may be located on one or more additional peripheral devices paired with the eyewear device 1002, neckband 1005, or some combination thereof.

Pairing external devices, such as the neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 since users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a stand-alone eyewear device. Since weight carried in the neckband 1005 may be less invasive to a user than weight carried in the eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1005 may be communicatively coupled with the eyewear device 1002 and/or to other devices. These other devices may provide certain functions (e.g., tracking, localizing, depth mapping, processing, storage, etc.) to the augmented-reality system 1000. In the embodiment of FIG. 10, the neckband 1005 may include two acoustic transducers (e.g., 1020(I) and 1020(J)) that are part of the microphone array (or potentially form their own microphone subarray). The neckband 1005 may also include a controller 1025 and a power source 1035.

The acoustic transducers 1020(I) and 1020(J) of the neckband 1005 may be configured to detect sound and convert the detected sound into an electronic format (analog or digital). In the embodiment of FIG. 10, the acoustic transducers 1020(I) and 1020(J) may be positioned on the neckband 1005, thereby increasing the distance between the neckband acoustic transducers 1020(I) and 1020(J) and other acoustic transducers 1020 positioned on the eyewear device 1002. In some cases, increasing the distance between the acoustic transducers 1020 of the microphone array may improve the accuracy of beamforming performed via the microphone array. For example, if a sound is detected by the acoustic transducers 1020(C) and 1020(D) and the distance between the acoustic transducers 1020(C) and 1020(D) is greater than, e.g., the distance between the acoustic transducers 1020(D) and 1020(E), the determined source location of the detected sound may be more accurate than if the sound had been detected by the acoustic transducers 1020(D) and 1020(E).

The controller 1025 of the neckband 1005 may process information generated by the sensors on the neckband 1005 and/or augmented-reality system 1000. For example, the controller 1025 may process information from the microphone array that describes sounds detected by the microphone array. For each detected sound, the controller 1025 may perform a direction-of-arrival (DOA) estimation to estimate a direction from which the detected sound arrived at the microphone array. As the microphone array detects sounds, the controller 1025 may populate an audio data set with the information. In embodiments in which the augmented-reality system 1000 includes an inertial measurement unit, the controller 1025 may compute all inertial and spatial calculations from the IMU located on the eyewear device 1002. A connector may convey information between the augmented-reality system 1000 and the neckband 1005 and between the augmented-reality system 1000 and the controller 1025. The information may be in the form of optical data, electrical data, wireless data, or any other transmittable data form. Moving the processing of information generated by the augmented-reality system 1000 to the neckband 1005 may reduce weight and heat in the eyewear device 1002, making it more comfortable to the user.

The power source 1035 in the neckband 1005 may provide power to the eyewear device 1002 and/or to the neckband 1005. The power source 1035 may include, without limitation, lithium ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. The virtual-reality system 1100 may include a front rigid body 1102 and a band 1104 shaped to fit around a user's head. The virtual-reality system 1100 may also include output audio transducers 1106(A) and 1106(B). Furthermore, while not shown in FIG. 11, the front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1000 and/or the virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 1000 and/or the virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality systems 1000 and 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
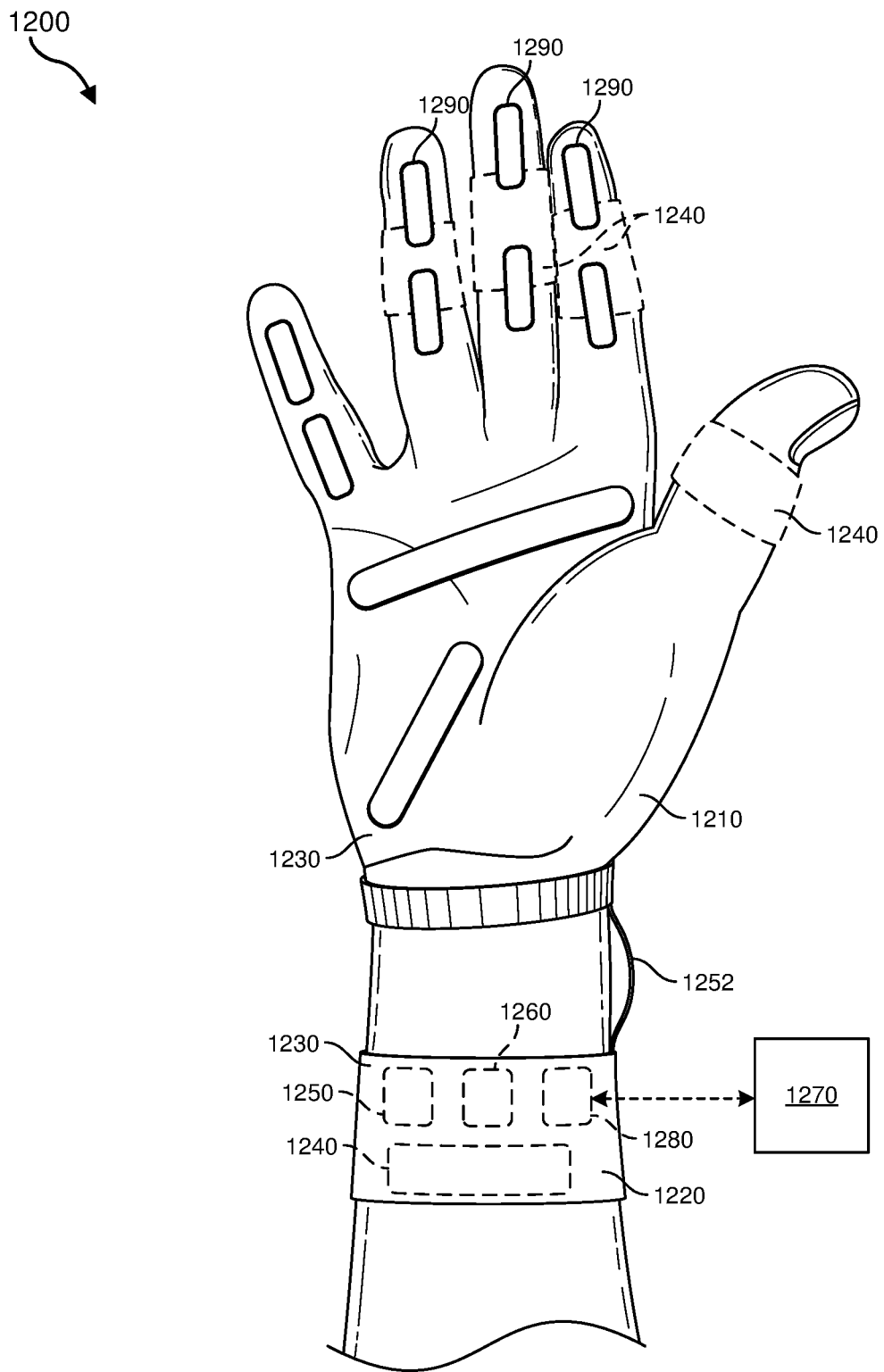
FIG. 12 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). The haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1240 may be positioned at least partially within one or more corresponding pockets formed in the textile material 1230 of the vibrotactile system 1200. The vibrotactile devices 1240 may be positioned in locations to provide a vibrating sensation (e.g., haptic feedback) to a user of the vibrotactile system 1200. For example, the vibrotactile devices 1240 may be positioned against the user's finger(s), thumb, or wrist, as shown in FIG. 12. The vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to the vibrotactile devices 1240, such as via conductive wiring 1252. In some examples, each of the vibrotactile devices 1240 may be independently electrically coupled to the power source 1250 for individual activation. In some embodiments, a processor 1260 may be operatively coupled to the power source 1250 and configured (e.g., programmed) to control activation of the vibrotactile devices 1240.

The vibrotactile system 1200 may be implemented in a variety of ways. In some examples, the vibrotactile system 1200 may be a standalone system with integral subsystems and components for operation independent of other devices and systems. As another example, the vibrotactile system 1200 may be configured for interaction with another device or system 1270. For example, the vibrotactile system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1280 may enable communications between the vibrotactile system 1200 and the other device or system 1270 via a wireless (e.g., Wi-Fi, BLUETOOTH, cellular, radio, etc.) link or a wired link. If present, the communications interface 1280 may be in communication with the processor 1260, such as to provide a signal to the processor 1260 to activate or deactivate one or more of the vibrotactile devices 1240.

The vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, the vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although the power source 1250, processor 1260, and communications interface 1280 are illustrated in FIG. 12 as being positioned in the haptic device 1220, the present disclosure is not so limited. For example, one or more of the power source 1250, processor 1260, or communications interface 1280 may be positioned within the haptic device 1210 or within another wearable textile.

Figure 13:
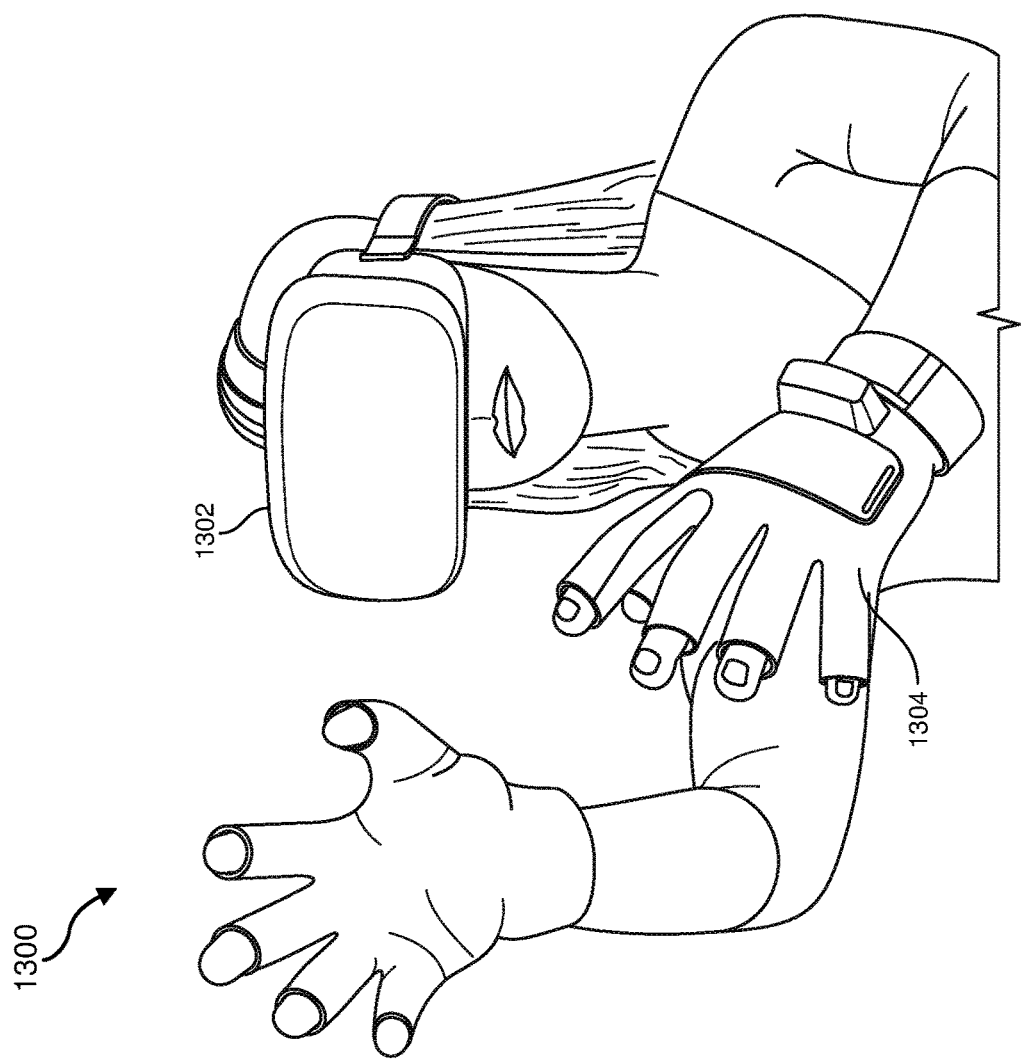
FIG. 13 is an illustration of an example virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 11:
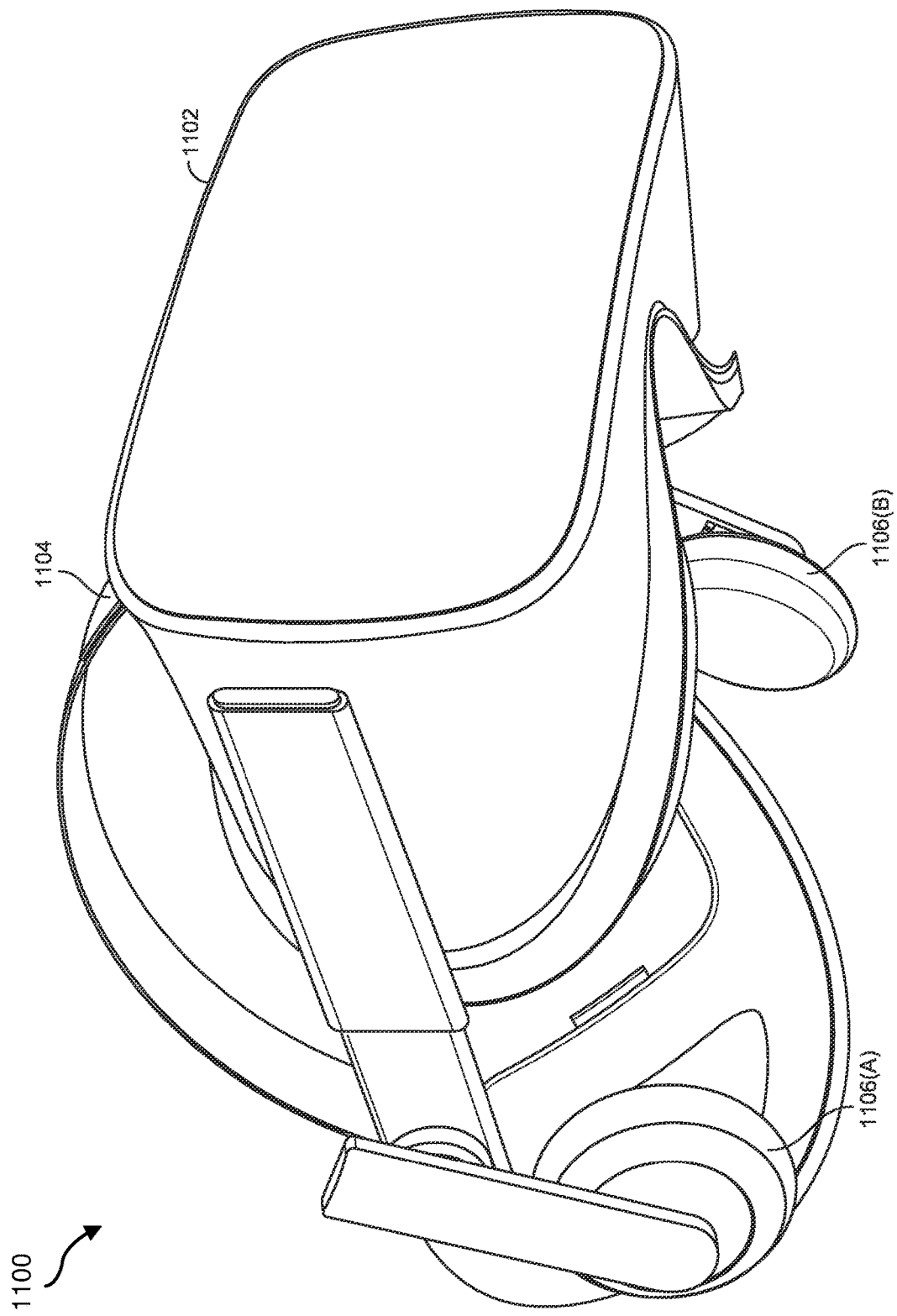
FIG. 11 is an illustration of an example virtual-reality headset that may be used in connection with embodiments of this disclosure.

Head-mounted display 1302 generally represents any type or form of virtual-reality system, such as the virtual-reality system 1100 in FIG. 11. Haptic device 1304 generally represents any type or form of wearable device, worn by a user of an artificial-reality system, that provides haptic feedback to the user to give the user the perception that he or she is physically engaging with a virtual object. In some embodiments, the haptic device 1304 may provide haptic feedback by applying vibration, motion, and/or force to the user. For example, the haptic device 1304 may limit or augment a user's movement. To give a specific example, the haptic device 1304 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use the haptic device 1304 to send action requests to a console. Examples of action requests include, without limitation, requests to start an application and/or end the application and/or requests to perform a particular action within the application.

Figure 14:
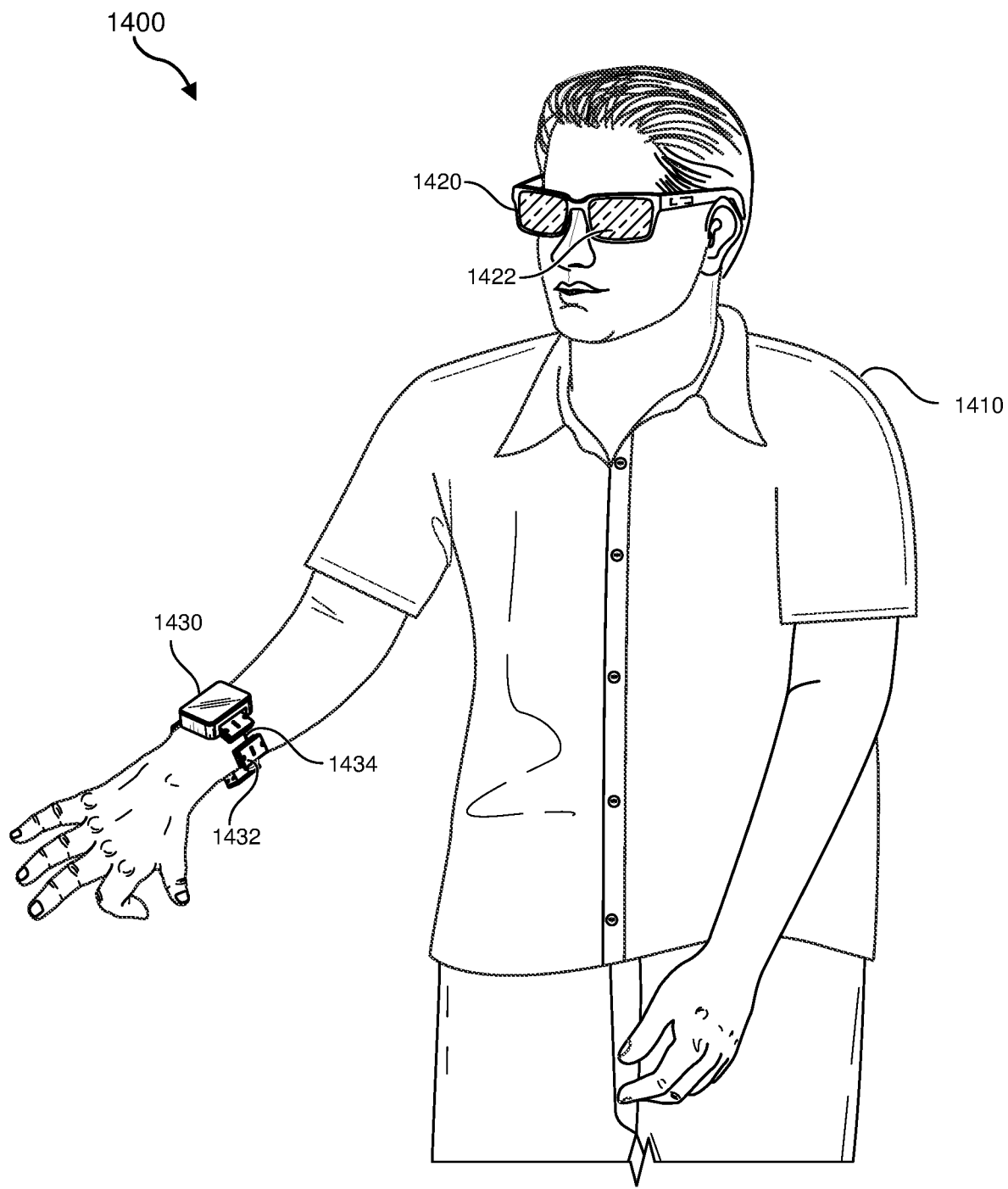
FIG. 14 is an illustration of an example augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view of a user 1410 interacting with an augmented-reality system 1400. In this example, the user 1410 may wear a pair of augmented-reality glasses 1420 that may have one or more displays 1422 and that are paired with a haptic device 1430. In this example, the haptic device 1430 may be a wristband that includes a plurality of band elements 1432 and a tensioning mechanism 1434 that connects the band elements 1432 to one another.

One or more of the band elements 1432 may include any type or form of actuator suitable for providing haptic feedback. For example, one or more of the band elements 1432 may be configured to provide one or more of various types of cutaneous feedback, including vibration, force, traction, texture, and/or temperature. To provide such feedback, the band elements 1432 may include one or more of various types of actuators. In one example, each of the band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1210, 1220, 1304, and 1430 may include any suitable number and/or type of haptic transducer, sensor, and/or feedback mechanism. For example, the haptic devices 1210, 1220, 1304, and 1430 may include one or more mechanical transducers, piezoelectric transducers, and/or fluidic transducers. The haptic devices 1210, 1220, 1304, and 1430 may also include various combinations of different types and forms of transducers that work together or independently to enhance a user's artificial-reality experience. In one example, each of the band elements 1432 of the haptic device 1430 may include a vibrotactor (e.g., a vibrotactile actuator) configured to vibrate in unison or independently to provide one or more of various types of haptic sensations to a user.

The following example embodiments are also included in the present disclosure.

Example 1: A strap adjustment device, which may include: a pinion gear; a first rack secured to a first strap and engaged with the pinion gear; a second rack secured to a second strap and engaged with the pinion gear; a rotatable cam element including at least one angled radially outer surface that is at an angle to a circumference of the rotatable cam element; at least one bearing element positioned adjacent to the at least one angled radially outer surface such that the at least one bearing element jams between the at least one angled radially outer surface and a braking surface when the rotatable cam element is rotated in a jamming direction; and at least one spiral spring coupled to the pinion gear and the rotatable cam element to allow for an increase in a length of the first and second straps upon application of a tension force to the first and second straps.

Example 2: The strap adjustment device of Example 1, wherein the braking surface comprises a ring surrounding the rotatable cam element.

Example 3: The strap adjustment device of Example 1 or Example 2, wherein the at least one bearing element comprises a cylindrical roller bearing element.

Example 4: The strap adjustment device of Example 3, wherein the roller bearing element comprises a metallic inner core and a polymer outer ring.

Example 5: The strap adjustment device of Example 4, wherein the polymer outer ring comprises at least one of: a blend of polycarbonate and acrylonitrile butadiene styrene; a nylon material; or a fluoropolymer material.

Example 6: The strap adjustment device of any of Examples 1 through 5, further comprising an adjustment knob comprising a pinion engagement protrusion extending inward from the adjustment knob in a location to engage with the pinion gear when the adjustment knob is rotated in a loosening direction.

Example 7: The strap adjustment device of Example 6, wherein the adjustment knob further comprises at least one cam protrusion extending inward from the adjustment knob in a location to engage with the rotatable cam element when the adjustment knob is rotated in a tightening direction.

Example 8: The strap adjustment device of Example 7, wherein the at least one cam protrusion is positioned to abut against the at least one bearing element when the adjustment knob is rotated in the loosening direction to unjam the at least one bearing element.

Example 9: The strap adjustment device of any of Examples 1 through 8, further comprising a spring biasing the at least one bearing element toward a jamming position.

Example 10: The strap adjustment device of Example 9, further comprising a plunger coupled to the spring and positioned to press against the at least one bearing element to bias the at least one bearing element toward the jamming position.

Example 11: The strap adjustment device of Example 10, wherein the plunger comprises a polymer material.

Example 12: The strap adjustment device of any of Examples 1 through 11, wherein the at least one spiral spring is preloaded to exert an initial holding force against the pinion.

Example 13: The strap adjustment device of any of Examples 1 through 12, wherein the at least one angled radially outer surface comprises a first angled radially outer surface and a second angled radially outer surface, wherein the first angled radially outer surface is angled relative to the circumference of the rotatable cam element in a first direction and the second angled radially outer surface is angled relative to the circumference of the rotatable cam element in a second, opposite direction.

Example 14: The strap adjustment device of any of Examples 1 through 13, wherein the at least one bearing element comprises at least three bearing elements and the at least one angled radially outer surface comprises at least three respective angled radially outer surfaces.

Example 15: An adjustable strap system for a head-mounted display (HMD), which may include: a strap adjustment device, comprising: a rotatable cam element; at least one rotatable bearing element that is configured to inhibit movement of a rotatable cam element when the rotatable cam element is rotated in a jamming direction; and a biasing element coupled to the rotatable cam element; a first strap configured to extend from a first side of the HMD to a first side of the strap adjustment device; and a second strap configured to extend from a second, opposite side of the HMD to a second, opposite side of the strap adjustment device, wherein the biasing element is configured to allow for an increase in a length of at least one of the first strap or the second strap when a tension force is applied to at least one of the first strap or the second strap.

Example 16: The adjustable strap system of Example 15, wherein the strap adjustment device further comprises a pinion gear, wherein the biasing element is coupled to the pinion gear and wherein the first strap and the second strap are engaged with the pinion gear.

Example 17: The adjustable strap system of Example 16, further comprising: a first rack secured to the first strap and engaged with the pinion gear; and a second rack secured to the second strap and engaged with the pinion gear.

Example 18: The adjustable strap system of Example 16 or Example 17, wherein the biasing element comprises at least one spiral spring coupled to and between the pinion gear and the rotatable cam element to allow for the increase in the length of at least one of the first strap or the second strap when the tension force is applied to at least one of the first strap or the second strap.

Example 19: The adjustable strap system of any of claims 15 through 18, further comprising an overhead strap extending from a top of the HMD to the strap adjustment device.

Example 20: A method of manufacturing a strap adjustment device, which may include: engaging a first rack coupled to a first strap with a pinion gear; engaging a second rack coupled to a second strap with the pinion gear; positioning a rotatable cam element adjacent to the pinion gear, wherein the rotatable cam element includes at least one angled radially outer surface that is at an angle to a circumference of the rotatable cam element; positioning at least one bearing element adjacent to the at least one angled radially outer surface such that the at least one bearing element jams against the at least one angled radially outer surface when the rotatable cam element is rotated in a jamming direction; and coupling at least one spiral spring to and between the pinion gear and the rotatable cam element to allow for an increase in a length of at least one of the first strap or the second strap.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A strap adjustment device, comprising:
   a pinion gear;
   a first rack secured to a first strap and engaged with the pinion gear;
   a second rack secured to a second strap and engaged with the pinion gear;
   a rotatable cam element including at least one angled radially outer surface that is at an angle to a circumference of the rotatable cam element;
   at least one bearing element positioned adjacent to the at least one angled radially outer surface such that the at least one bearing element jams between the at least one angled radially outer surface and a braking surface when the rotatable cam element is rotated in a jamming direction, the braking surface comprising a ring surrounding the rotatable cam element; and
   at least one spiral spring coupled to the pinion gear and the rotatable cam element to allow for an increase in a length of the first and second straps upon application of a tension force to the first and second straps.

2. The strap adjustment device of claim 1, wherein the at least one bearing element comprises a cylindrical roller bearing element.

3. The strap adjustment device of claim 2, wherein the roller bearing element comprises a metallic inner core and a polymer outer ring.

4. The strap adjustment device of claim 3, wherein the polymer outer ring comprises at least one of:
   a blend of polycarbonate and acrylonitrile butadiene styrene;
   a nylon material; or
   a fluoropolymer material.

5. The strap adjustment device of claim 1, further comprising an adjustment knob comprising a pinion engagement protrusion extending inward from the adjustment knob in a location to engage with the pinion gear when the adjustment knob is rotated in a loosening direction.

6. The strap adjustment device of claim 5, wherein the adjustment knob further comprises at least one cam protrusion extending inward from the adjustment knob in a location to engage with the rotatable cam element when the adjustment knob is rotated in a tightening direction.

7. The strap adjustment device of claim 6, wherein the at least one cam protrusion is positioned to abut against the at least one bearing element when the adjustment knob is rotated in the loosening direction to unjam the at least one bearing element.

8. The strap adjustment device of claim 1, further comprising a spring biasing the at least one bearing element toward a jamming position.

9. The strap adjustment device of claim 8, further comprising a plunger coupled to the spring and positioned to press against the at least one bearing element to bias the at least one bearing element toward the jamming position.

10. The strap adjustment device of claim 9, wherein the plunger comprises a polymer material.

11. The strap adjustment device of claim 1, wherein the at least one spiral spring is preloaded to exert an initial holding force against the pinion.

12. The strap adjustment device of claim 1, wherein the at least one angled radially outer surface comprises a first angled radially outer surface and a second angled radially outer surface, wherein the first angled radially outer surface is angled relative to the circumference of the rotatable cam element in a first direction and the second angled radially outer surface is angled relative to the circumference of the rotatable cam element in a second, opposite direction.

13. The strap adjustment device of claim 1, wherein the at least one bearing element comprises at least three bearing elements and the at least one angled radially outer surface comprises at least three respective angled radially outer surfaces.

14. An adjustable strap system for a head-mounted display (HMD), comprising:
   a strap adjustment device, comprising:
      a rotatable cam element;
      at least one rotatable bearing element that is configured to inhibit movement of the rotatable cam element when the rotatable cam element is rotated in a jamming direction; and
      a biasing element coupled to the rotatable cam element to bias the rotatable cam element in a rotational direction;
   a first strap configured to extend from a first side of the HMD to a first side of the strap adjustment device; and
   a second strap configured to extend from a second, opposite side of the HMD to a second, opposite side of the strap adjustment device,
   wherein the biasing element is configured to allow for an increase in a length of at least one of the first strap or the second strap when a tension force is applied to at least one of the first strap or the second strap.

15. The adjustable strap system of claim 14, wherein the strap adjustment device further comprises a pinion gear, wherein the biasing element is coupled to the pinion gear and wherein the first strap and the second strap are engaged with the pinion gear.

16. The adjustable strap system of claim 15, further comprising:
   a first rack secured to the first strap and engaged with the pinion gear; and
   a second rack secured to the second strap and engaged with the pinion gear.

17. The adjustable strap system of claim 15, wherein the biasing element comprises at least one spiral spring coupled to and between the pinion gear and the rotatable cam element to allow for the increase in the length of at least one of the first strap or the second strap when the tension force is applied to at least one of the first strap or the second strap.

18. The adjustable strap system of claim 14, further comprising an overhead strap configured to extend from a top of the HMD to the strap adjustment device.

19. A method of manufacturing a strap adjustment device, the method comprising:
   engaging a first rack coupled to a first strap with a pinion gear;
   engaging a second rack coupled to a second strap with the pinion gear;
   positioning a rotatable cam element adjacent to the pinion gear, wherein the rotatable cam element includes at least one angled radially outer surface that is at an angle to a circumference of the rotatable cam element;
   positioning at least one bearing element adjacent to the at least one angled radially outer surface such that the at least one bearing element jams against the at least one angled radially outer surface when the rotatable cam element is rotated in a jamming direction; and
   coupling at least one spiral spring to and between the pinion gear and the rotatable cam element to allow for an increase in a length of at least one of the first strap or the second strap, wherein the at least one spiral spring is positioned and configured to bias the rotatable cam in a rotational direction.

* * * * *